US012701232B2

(12) United States Patent
Nguyen Canh et al.

(10) Patent No.: US 12,701,232 B2
(45) Date of Patent: Aug. 4, 2026

(54) ENTROPY CODING OF RESIDUALS

(71) Applicant: Tencent America LLC, Palo Alto, CA (US)

(72) Inventors: Thuong Nguyen Canh, Palo Alto, CA (US); Chao Huang, Palo Alto, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 19/059,241

(22) Filed: Feb. 20, 2025

(65) Prior Publication Data

US 2025/0310528 A1 Oct. 2, 2025

Related U.S. Application Data

(60) Provisional application No. 63/571,395, filed on Mar. 28, 2024, provisional application No. 63/570,214, filed on Mar. 26, 2024.

(51) Int. Cl.
*H04N 19/13* (2014.01)
*G06T 9/00* (2006.01)
*H04N 19/91* (2014.01)

(52) U.S. Cl.
CPC ............. *H04N 19/13* (2014.11); *G06T 9/001* (2013.01); *H04N 19/91* (2014.11)

(58) Field of Classification Search
CPC ...... H04N 19/13; H04N 19/91; H04N 19/597; H04N 19/70; G06T 9/001
USPC ...................................................... 375/240.2
See application file for complete search history.

(56) References Cited

U.S. PATENT DOCUMENTS

| | | | | |
|---|---|---|---|---|
| 5,905,502 A | * | 5/1999 | Deering .................. | G06T 9/001 |
| | | | | 708/203 |
| 6,262,737 B1 | * | 7/2001 | Li ........................... | G06T 17/20 |
| | | | | 375/E7.092 |
| 9,214,042 B2 | * | 12/2015 | Cai ........................ | G06T 17/205 |
| 2017/0091997 A1 | * | 3/2017 | Tuffreau ............... | G06T 17/205 |

(Continued)

OTHER PUBLICATIONS

Marpe et al., Efficient representation and coding of prediction residuals and parameters in frame-based animated mesh compression, 2008 15th IEEE International Conference on Image Processing, San Diego, CA, USA, 2008, pp. 2680-2683 (Year: 2008).*

(Continued)

*Primary Examiner* — Marnie A Matt
(74) *Attorney, Agent, or Firm* — ARENTFOX SCHIFF LLP

(57) ABSTRACT

Aspects of the disclosure includes methods and apparatuses for mesh coding. The method includes receiving coded information of a bitstream of a mesh that includes a plurality of residuals. The method includes performing entropy decoding on a current residual in the plurality of residuals based on a maximum value for arithmetic coding and a type of entropy coding for a sign of the current residual in the plurality of residuals, and reconstructing the mesh based on the entropy decoded current residual. The sign of the current residual is determined based on a previous sign and whether the sign of the current residual is flipped from the previous sign, or the maximum value for the arithmetic coding is based on a bit depth associated with the current residual.

20 Claims, 10 Drawing Sheets

(56) References Cited

U.S. PATENT DOCUMENTS

| 2021/0174551 A1* | 6/2021 | Graziosi | G06T 9/001 |
| 2021/0217203 A1* | 7/2021 | Kim | G06T 9/001 |
| 2021/0385478 A1* | 12/2021 | Yoo | H04N 19/13 |
| 2022/0070472 A1* | 3/2022 | Yoo | H04N 19/176 |
| 2022/0279200 A1* | 9/2022 | Jang | H04N 19/105 |
| 2023/0076939 A1* | 3/2023 | Mammou | G06T 9/001 |
| 2024/0146964 A1* | 5/2024 | Choi | H04N 19/13 |

OTHER PUBLICATIONS

Kwak et al., Hybrid compression of dynamic 3D mesh data, 2014 IEEE International Conference on Acoustics, Speech and Signal Processing (ICASSP), Florence, Italy, 2014, pp. 6142-6146 (Year: 2014).*

* cited by examiner

500

Absolute symbol |n|

Sign bit (702)
Positive sign: $n > 0$
Negative sign: $n < 0$

Significant bit (701)

Greater than one bit (703)

Greater than two bits (704)

Range encoding bits (705)

Maximum AC (maxAC) (707)

Exponential-Golomb code (706)

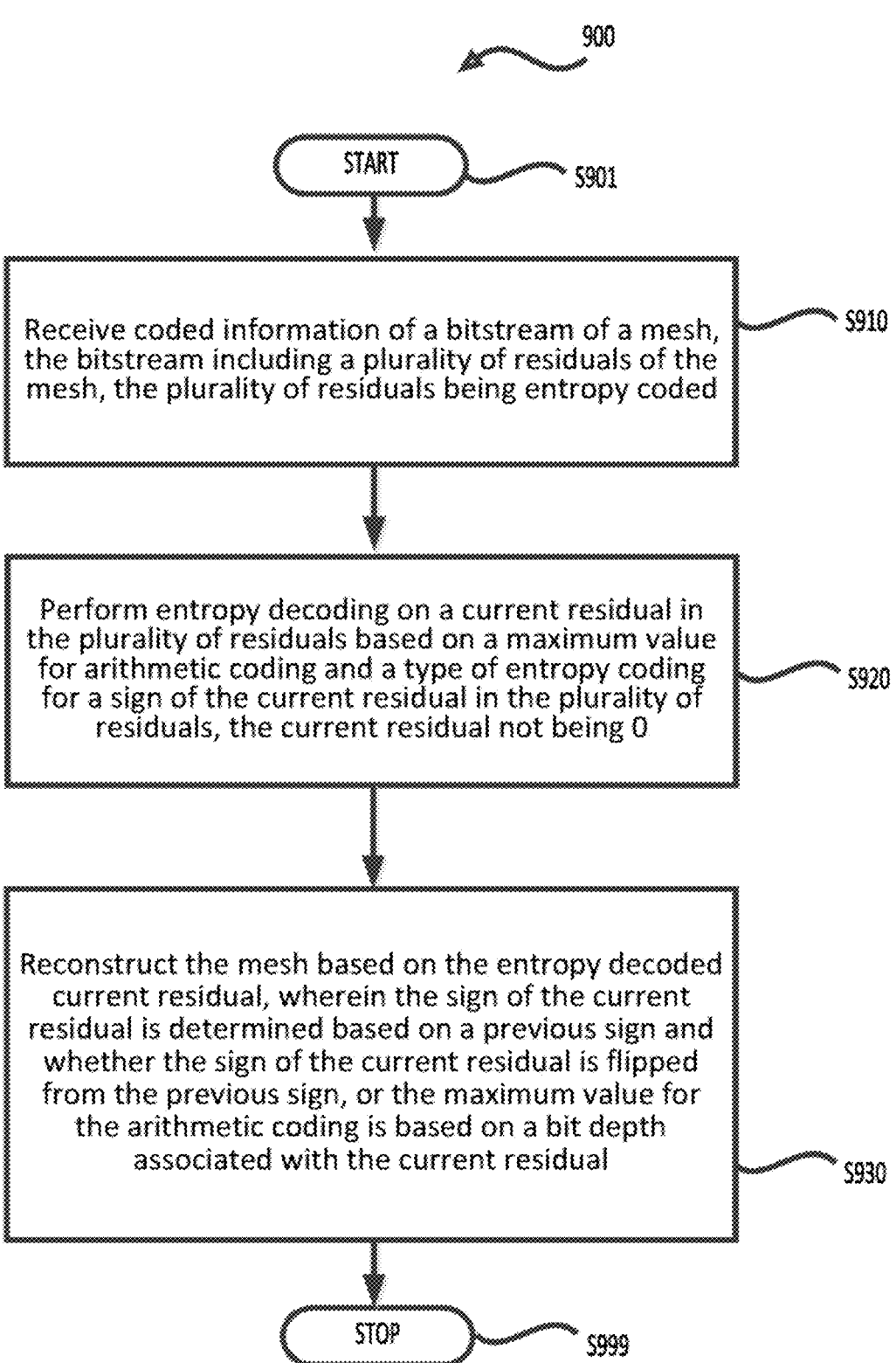

900

START — S901

Receive coded information of a bitstream of a mesh, the bitstream including a plurality of residuals of the mesh, the plurality of residuals being entropy coded — S910

Perform entropy decoding on a current residual in the plurality of residuals based on a maximum value for arithmetic coding and a type of entropy coding for a sign of the current residual in the plurality of residuals, the current residual not being 0 — S920

Reconstruct the mesh based on the entropy decoded current residual, wherein the sign of the current residual is determined based on a previous sign and whether the sign of the current residual is flipped from the previous sign, or the maximum value for the arithmetic coding is based on a bit depth associated with the current residual — S930

STOP — S999

*FIG. 9*

ENTROPY CODING OF RESIDUALS

INCORPORATION BY REFERENCE

The present application claims the benefit of priority to U.S. Provisional Application No. 63/570,214, "ADAPTIVE MAXIMUM RANGE FOR ARITHMETIC CODING" filed on Mar. 26, 2024, and U.S. Provisional Application No. 63/571,395, "ADAPTIVE ARITHMETIC CODING FOR FLIPPED SIGN IN MESH COMPRESSION" filed on Mar. 28, 2024, which are incorporated by reference herein in their entirety.

TECHNICAL FIELD

The present disclosure describes aspects generally related to mesh processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression may help transmit image/video data across different devices, storage and networks with minimal quality degradation. In some examples, video codec technology may compress video based on spatial and temporal redundancy. In an example, a video codec may use techniques referred to as intra prediction that may compress an image based on spatial redundancy. For example, the intra prediction may use reference data from the current picture under reconstruction for sample prediction. In another example, a video codec may use techniques referred to as inter prediction that may compress an image based on temporal redundancy. For example, the inter prediction may predict samples in a current picture from a previously reconstructed picture with motion compensation. The motion compensation may be indicated by a motion vector (MV).

Advances in three-dimensional (3D) capture, modeling, and rendering have promoted 3D content across various platforms and devices. For example, a baby's first step in one continent is captured and grandparents may see (and in some cases interact) and enjoy a full immersive experience with the child in another continent. In order to achieve such realism, models are becoming more sophisticated, and a significant amount of data is linked to the creation and consumption of those models. 3D meshes are widely used to represent such immersive contents.

SUMMARY

Aspects of the disclosure include a decoding method. The decoding method includes receiving coded information of a bitstream of a mesh. The bitstream includes a plurality of residuals of the mesh. The plurality of residuals is entropy coded. The method includes performing entropy decoding on a current residual in the plurality of residuals based on a maximum value for arithmetic coding and a type of entropy coding for a sign of the current residual in the plurality of residuals. The current residual is not 0. An absolute value of the current residual is to be decoded using the arithmetic coding when the absolute value of the current residual is within a range of two to the maximum value for the arithmetic coding. The method includes reconstructing the mesh based on the entropy decoded current residual. The sign of the current residual is determined based on a previous sign and whether the sign of the current residual is flipped from the previous sign, or the maximum value for the arithmetic coding is based on a bit depth associated with the current residual.

Aspects of the disclosure also provide an apparatus for mesh decoding. The apparatus for mesh decoding including processing circuitry configured to implement any of the described methods including the decoding method of mesh coding performed in a decoder.

In an aspect, a method of mesh encoding includes performing entropy encoding on a current residual in a plurality of residuals of a mesh based on a maximum value for arithmetic coding and a type of entropy coding for a sign of the current residual in the plurality of residuals, and encoding the mesh based on the entropy encoded current residual. The current residual is not 0. The sign of the current residual is encoded based on a previous sign and whether the sign of the current residual is flipped from the previous sign, or the maximum value for the arithmetic coding is determined based on a bit depth associated with the current residual. In an aspect, an absolute value of the current residual is to be encoded using the arithmetic coding when the absolute value of the current residual is within a range of two to the maximum value for the arithmetic coding.

Aspects of the disclosure also provide an apparatus for mesh encoding. The apparatus for mesh encoding including processing circuitry configured to implement any of the described methods of mesh coding performed in an encoder.

In an aspect, a method of processing a mesh includes processing a bitstream of the mesh according to a format rule. The bitstream includes a plurality of residuals of the mesh. The plurality of residuals is entropy coded. The format rule specifies that: entropy decoding is performed on a current residual that is not 0 in the plurality of residuals based on a maximum value for arithmetic coding and a type of entropy coding method for a sign of the current residual in the plurality of residuals; an absolute value of the current residual is to be decoded using the arithmetic coding when the absolute value of the current residual is within a range of two to the maximum value for the arithmetic coding; the mesh is reconstructed based on the entropy decoded current residual; and the sign of the current residual is determined based on a previous sign and whether the sign of the current residual is flipped from the previous sign, or the maximum value for the arithmetic coding is based on a bit depth associated with the current residual.

Aspects of the disclosure also provide a non-transitory computer-readable medium storing instructions which, when executed by a computer, cause the computer to perform any of the described methods for mesh coding.

Technical solutions of the disclosure include aspects directed to reducing signaling requirements for coding signs of a plurality of residuals in mesh coding and/or finely tuning entropy coding parameters for a specific data set, accommodating the statistical characteristics that come with different bit depths. In an example, entropy decoding is performed on a current residual in a plurality of residuals of the mesh based on a maximum value for arithmetic coding and a type of entropy coding for a sign of the current residual in the plurality of residuals. In an aspect, the sign of the current residual is determined based on a previous sign and whether the sign of the current residual is flipped from the previous sign. Thus, by exploiting the correlation between consecutive signs, redundancy is reduced, such as in sequences in which long runs of the same sign frequently occur. In an aspect, the maximum value for the arithmetic coding is based on a bit depth associated with the current residual. Thus, this adaptation enables the encoding of larger residuals without excessive bit rate overhead, can better ensure that the probabilities of larger values are more accurately represented within the encoding context. Further, this adaptation can better ensure that the entropy coding scheme does not allocate unnecessary bits for highly improbable large values, thereby maintaining coding efficiency.

BRIEF DESCRIPTION OF THE DRAWINGS

Further features, the nature, and various advantages of the disclosed subject matter will be more apparent from the following detailed description and the accompanying drawings in which:

FIG. 9 shows a flow chart outlining a decoding process according to some aspects of the disclosure.

DETAILED DESCRIPTION

Figure 1:
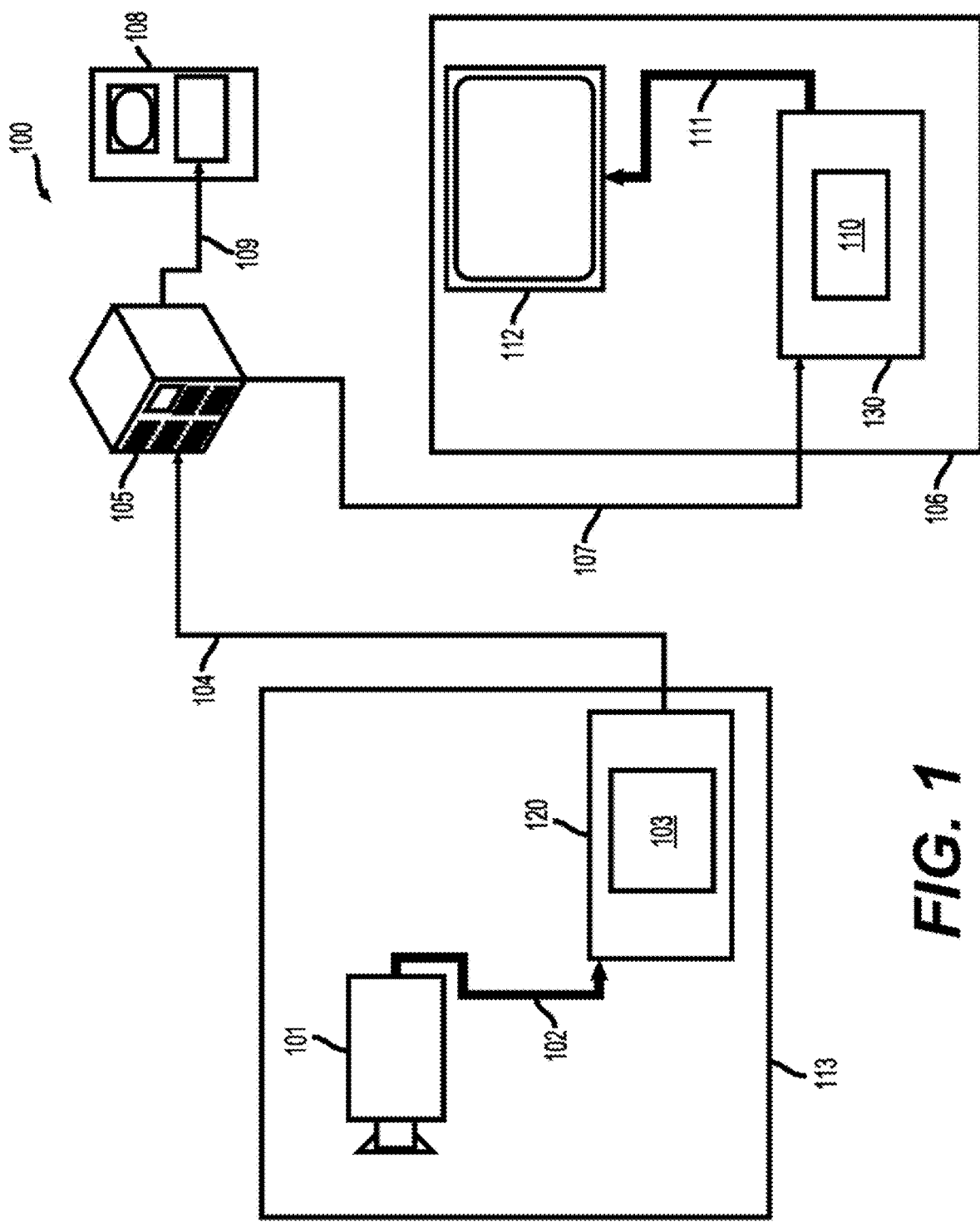
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter may be equally applicable to other image and/or video enabled applications, including, for example, video conferencing, digital TV, streaming services, storing of compressed video on digital media including CD, DVD, memory stick, and the like.

The video processing system (100) includes a capture subsystem (113), that may include a video source (101). The video source (101) may include one or more images captured by a camera and/or generated by a computer. For example, a digital camera may create a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), may be processed by an electronic device (120) that includes a video encoder (103) coupled to the video source (101). The video encoder (103) may include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), may be stored on a streaming server (105) for future use. One or more streaming client subsystems, such as client subsystems (106) and (108) in FIG. 1 may access the streaming server (105) to retrieve copies (107) and (109) of the encoded video data (104). A client subsystem (106) may include a video decoder (110), for example, in an electronic device (130). The video decoder (110) decodes the incoming copy (107) of the encoded video data and creates an outgoing stream of video pictures (111) that may be rendered on a display (112) (e.g., display screen) or other rendering device (not depicted). In some streaming systems, the encoded video data (104), (107), and (109) (e.g., video bitstreams) may be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) may include other components (not shown). For example, the electronic device (120) may include a video decoder (not shown) and the electronic device (130) may include a video encoder (not shown) as well.

Figure 2:
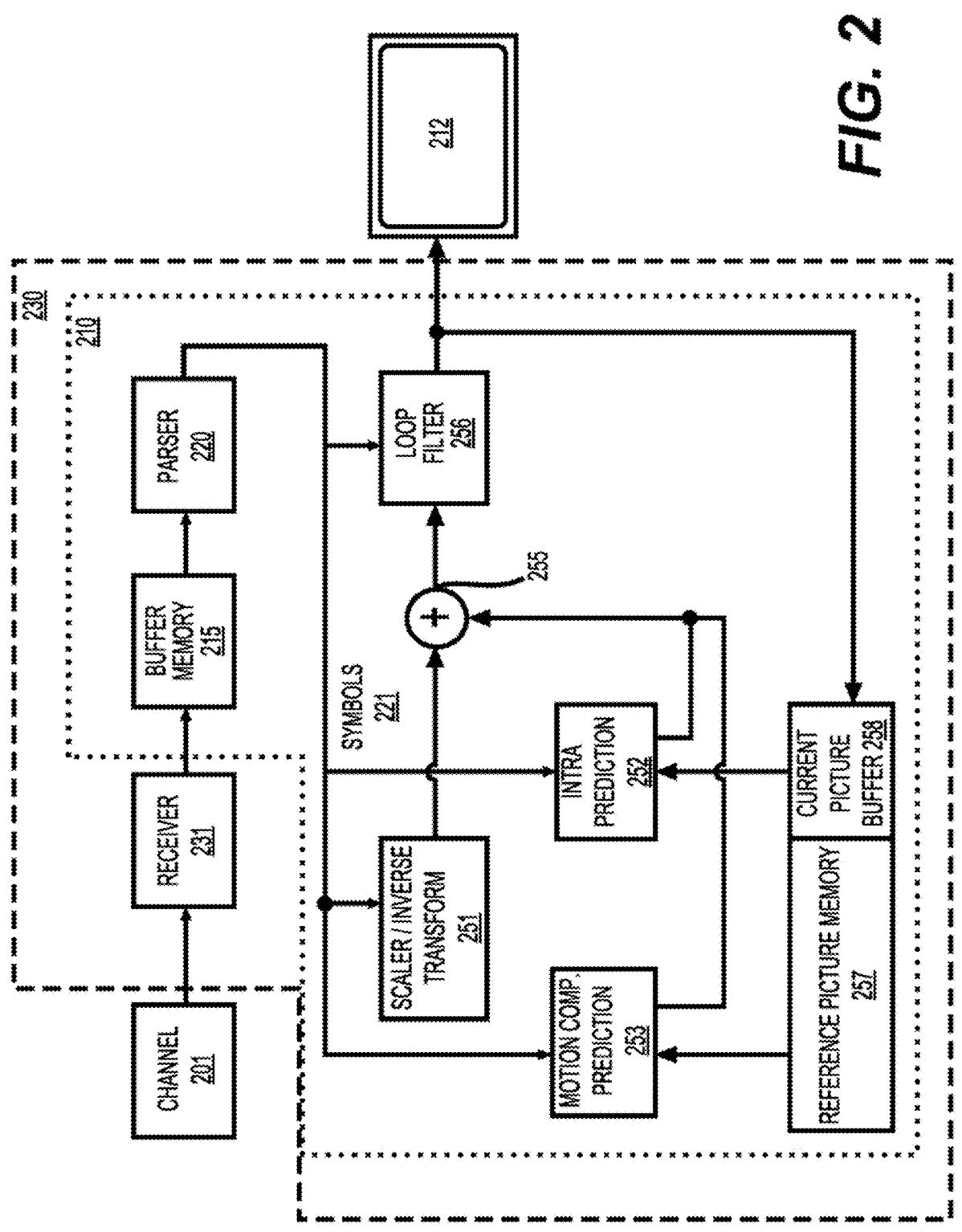
FIG. 2 is a schematic illustration of an example of a block diagram of a decoder.

FIG. 2 shows an example of a block diagram of a video decoder (210). The video decoder (210) may be included in an electronic device (230). The electronic device (230) may include a receiver (231). The receiver (231) may include receiving circuitry, such as network interface circuitry. The video decoder (210) may be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it may be outside of the video decoder (210) (not depicted). In still others, there may be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or may be small. For use on best effort packet networks such as the Internet, the buffer memory (215) may be required, may be comparatively large and may be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but may be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence may be in accordance with a video coding technology or standard, and may follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups may include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) may involve multiple different units depending on the type of the coded video picture or parts thereof (such as: inter and intra picture, inter and intra block), and other factors. Which units are involved, and how, may be controlled by subgroup control information parsed from the coded video sequence by the parser (220). The flow of such subgroup control information between the parser (220) and the multiple units below is not depicted for clarity.

Beyond the functional blocks already mentioned, the video decoder (210) may be conceptually subdivided into a number of functional units as described below. In a practical implementation operating under commercial constraints, many of these units interact closely with each other and may, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) may output blocks comprising sample values, that may be input into aggregator (255).

In some cases, the output samples of the scaler/inverse transform unit (251) may pertain to an intra coded block. The intra coded block is a block that is not using predictive information from previously reconstructed pictures, but may use predictive information from previously reconstructed parts of the current picture. Such predictive information may be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) may pertain to an inter coded, and potentially motion compensated, block. In such a case, a motion compensation prediction unit (253) may access reference picture memory (257) to fetch samples used for prediction. After motion compensating the fetched samples in accordance with the symbols (221) pertaining to the block, these samples may be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples may be controlled by motion vectors, available to the motion compensation prediction unit (253) in the form of symbols (221) that may have, for example X, Y, and reference picture components. Motion compensation also may include interpolation of sample values as fetched from the reference picture memory (257) when sub-sample exact motion vectors are in use, motion vector prediction mechanisms, and so forth.

The output samples of the aggregator (255) may be subject to various loop filtering techniques in the loop filter unit (256). Video compression technologies may include in-loop filter technologies that are controlled by parameters included in the coded video sequence (also referred to as coded video bitstream) and made available to the loop filter unit (256) as symbols (221) from the parser (220). Video compression may also be responsive to meta-information obtained during the decoding of previous (in decoding order) parts of the coded picture or coded video sequence, as well as responsive to previously reconstructed and loop-filtered sample values.

The output of the loop filter unit (256) may be a sample stream that may be output to the render device (212) as well as stored in the reference picture memory (257) for use in future inter-picture prediction.

Certain coded pictures, once fully reconstructed, may be used as reference pictures for future prediction. For example, once a coded picture corresponding to a current picture is fully reconstructed and the coded picture has been identified as a reference picture (by, for example, the parser (220)), the current picture buffer (258) may become a part of the reference picture memory (257), and a fresh current picture buffer may be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile may select certain tools as the only tools available for use under that profile from all the tools available in the video compression technology or standard. Also necessary for compliance may be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels may, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data may be in the form of, for example, temporal, spatial, or signal noise ratio (SNR) enhancement layers, redundant slices, redundant pictures, forward error correction codes, and so on.

Figure 3:
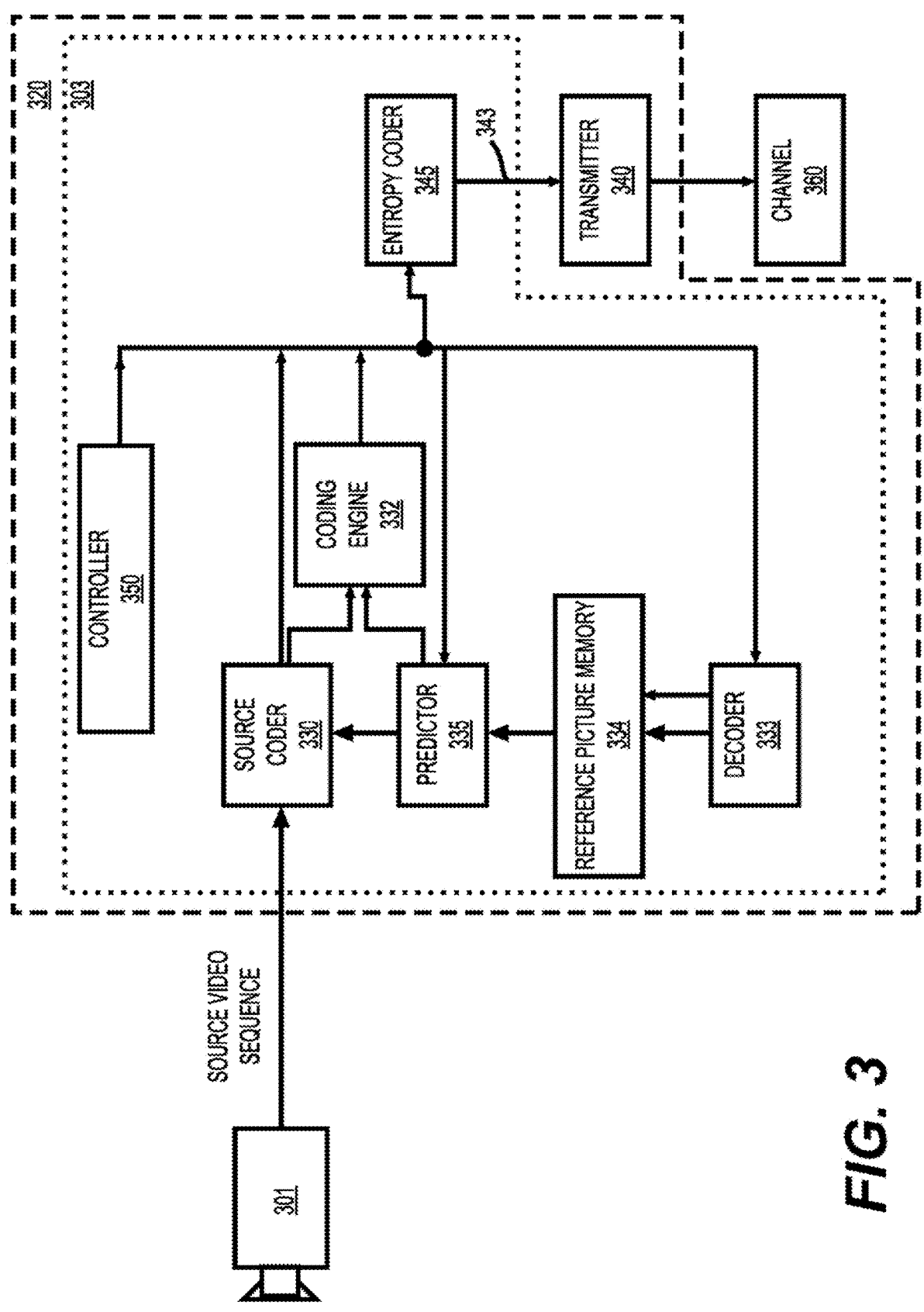
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) may be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that may be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels. Each pixel may include one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) may include rate control related parameters (picture skip, quantizer, lambda value of rate-distortion optimization techniques, . . . ), picture size, group of pictures (GOP) layout, maximum motion vector search range, and so forth. The controller (350) may be configured to have other suitable functions that pertain to the video encoder (303) optimized for a certain system design.

In some aspects, the video encoder (303) is configured to operate in a coding loop. As an oversimplified description, in an example, the coding loop may include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity may not be maintained, for example because of channel errors) is used in some related arts as well.

The operation of the "local" decoder (333) may be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) may be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies may be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using at most one motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures may use more than two reference pictures and associated metadata for the reconstruction of a single block.

Aspect of the present disclosure may also be applied to variants of I pictures, P pictures, and B pictures, and their respective applications and features.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may include temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes use of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture may be coded by a vector that is referred to as a motion vector. The motion vector points to the reference block in the reference picture, and may have a third dimension identifying the reference picture, in case multiple reference pictures are in use.

In some aspects, a bi-prediction technique may be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture may be coded by a first motion vector that points to a first reference block in the first reference picture, and a second motion vector that points to a second reference block in the second reference picture. The block may be predicted by a combination of the first reference block and the second reference block.

Further, a merge mode technique may be used in the inter-picture prediction to improve coding efficiency.

According to some aspects of the disclosure, predictions, such as inter-picture predictions and intra-picture predictions, are performed in the unit of blocks, such as a polygon-shaped or triangular block. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU may be recursively quadtree split into one or multiple coding units (CUs). For example, a CTU of 64×64 pixels may be split into one CU of 64×64 pixels, 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs.

In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) may be implemented using any suitable technique. In an aspect, the video encoders (103) and (303) and the video decoders (110) and (210) may be implemented using one or more integrated circuits. In another aspect, the video encoders (103) and (303), and the video decoders (110) and (210) may be implemented using one or more processors that execute software instructions.

The disclosure includes aspects related to methods and apparatuses for entropy coding including entropy coding of residuals, for example, for mesh compression or polygon mesh compression.

A mesh may include a plurality of polygons (such as a plurality of polygonal faces) that may describe a surface of a volumetric object. For example, the surface of the volumetric object may be approximated using the mesh. Each polygon of the mesh may be defined by vertices of the corresponding polygon in a three-dimensional (3D) space and information of how the vertices are connected, which may be referred to as connectivity information. In some aspects, vertex attributes, such as colors, normals, displacements, and the like, may be associated with the vertices (also referred to as the mesh vertices). Attributes (also referred to as vertex attributes) may also be associated with the surface of the mesh by exploiting mapping information that parameterizes the mesh with two-dimensional (2D) attribute maps. Such mapping may be described by a set of parametric coordinates, referred to as UV coordinates or texture coordinates, associated with the mesh vertices. 2D attribute maps may be used to store high resolution attribute information such as texture, normals, displacements, and the like. The high resolution attribute information may be used for various purposes such as texture mapping, shading, and mesh reconstruction.

Figure 4:
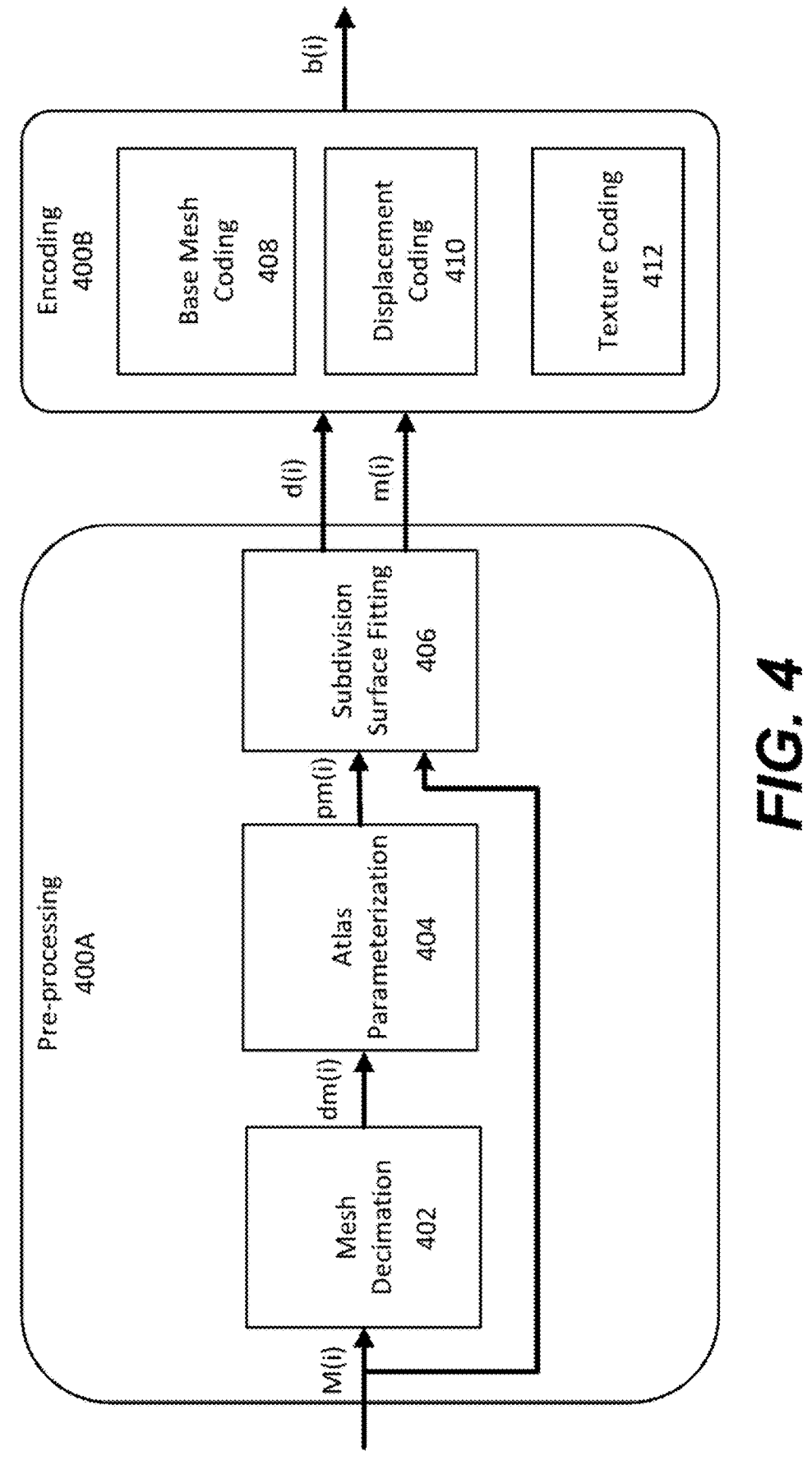
FIG. 4 shows an example of an encoding process for mesh processing based on a related video codec according to an aspect of the disclosure.

FIG. 4 shows an example of an encoding process (400) for mesh processing based on a related video codec according to an aspect of the disclosure. As shown in FIG. 4, the encoding process (400) may include a pre-processing step (400A) and an encoding step (400B). The pre-processing step (400A) may be configured to generate a base mesh m(i) of a current frame and a displacement field d(i) of the current frame that includes displacement vectors according to an input mesh M(i) of the current frame. The encoding step (400B) may be configured to encode the base mesh m(i), the displacement field d(i), and texture information of the base mesh m(i). The displacement field d(i) of the current frame may include displacement vectors. An index i may refer to the current frame. In an aspect, a mode decision method may be performed in the encoding process (400) to determine whether inter coding (also referred to as inter frame prediction or an inter mode), intra coding (also referred to as intra frame prediction or an intra mode), or the like is applied to the current frame. For example, the mode decision method may compare a cost of an intra mode and a cost of an inter mode and decide a coding mode of the base mesh m(i) of the current frame based on which one of the costs is smaller. In some examples, a skip mode is used to code (e.g., encode or decode) the base mesh m(i). In an example, the skip mode is a special mode of the inter mode. For example, the base mesh m(i) may be intra coded, or inter coded, or coded with the SKIP mode.

Still referring to FIG. 4, the pre-processing step (400A) may include a mesh decimation process (402), a parameterization process such as an atlas parameterization process (404), and a subdivision surface fitting process (406). The mesh decimation process (402) is configured to down-sample vertices of the input mesh M(i) to generate a decimated mesh dm(i) that may include a plurality of decimated (or down-sampled) vertices. A number of the plurality of decimated vertices is less than a number of the vertices of the input mesh M(i). The parameterization process such as the atlas parameterization process (404) is configured to map the decimated mesh dm(i) onto a planar domain, such as onto a UV atlas (or a UV map), to generate a re-parameterized mesh pm(i). In an example, the atlas parameterization may be performed based on a video processing tool, such as a UVAtlas tool. The subdivision surface fitting process (406) is configured to take the re-parameterized mesh pm(i) and the input mesh M(i) as inputs and produce a based mesh m(i) together with the displacement field d(i) that includes the displacement vectors or a set of displacements. In an example of the subdivision surface fitting process (406), pm(i) is subdivided by using a subdivision scheme such as an iterative interpolation to obtain a subdivided mesh. The iterative interpolation includes inserting at each iteration a new point in a middle of each edge of the re-parameterized mesh pm(i). Any suitable subdivision scheme may be applied to subdivide pm(i). The displacement field d(i) is computed by determining a nearest point on a surface of the input mesh M(i) for each vertex of the subdivided mesh.

An advantage of the subdivided mesh may include that the subdivided mesh has a subdivision structure that allows efficient compression, while offering a faithful approximation of the input mesh. The compression efficiency may be obtained due to the following properties. The decimated mesh dm(i) may have a low number of vertices and may be encoded and transmitted using a lower number of bits than the input mesh M(i) or the subdivided mesh. Referring to FIG. 4, the base mesh m(i) may be generated from the decimated mesh dm(i). In an example, the base mesh m(i) is the decimated mesh dm(i). As the subdivided mesh may be generated based on the subdivision method, the subdivided mesh may be automatically generated by the decoder when the base mesh or the decimated mesh is decoded (e.g., there is no need to use any information other than the subdivision scheme and a subdivision iteration count). At the decoder side, the displacement field d(i) may be generated by decoding the displacement vectors associated with the vertices of the subdivided mesh. Besides allowing for spatial/quality scalability, the subdivision structure enables efficient transforms such as wavelet decomposition, which can offer high compression performance.

The encoding step (400B) may include a base mesh coding (408), a displacement coding (410), a texture coding (412), and the like. The base mesh coding (408) is configured to encode geometric information of the base mesh m(i) associated with the current frame. In an intra encoding, the base mesh m(i) may be first quantized (e.g., using uniform quantization) and then encoded, for example, by the coding mode determined using the mode decision method. The coding mode may be the inter mode, the intra mode, the skip mode, or the like. The encoder used to intra code the base mesh m(i) may be referred to as a static mesh encoder. In the inter encoding, a reference base mesh (e.g., a reconstructed quantized reference base mesh m' (j)) associated with a reference frame indicated by an index j may be used to predict the base mesh m(i) associated with the current frame indicated by the index i. The displacement coding (410) is configured to encode the displacement field d(i) that is generated in the pre-processing step (400A). The displacement field d(i) may include a set of displacement vectors (or displacements) associated with the subdivided mesh vertices. The texture coding (412) is configured to encode attribute information of the base mesh m(i). The attribute information may include texture, normal, color, and/or the like. The attribute information may be encoded based on a suitable codec, such as High-Efficiency Video Coding (HEVC) or Versatile Video Coding (VVC).

In an aspect, referring to FIG. 4, a mesh encoding process such as the encoding process (400) starts with a pre-processing (e.g., the pre-processing step (400A)). The pre-processing may convert the input mesh M(i) into the base mesh m(i) together with the displacement field d(i) including a set of displacements (or a set of displacement vectors). The encoding step (400B) may compress outputs (e.g., m(i), d(i), and the like) from the pre-processing and generate a compressed bitstream b(i). The compressed bitstream b(i) may include a compressed base mesh bitstream, a compressed displacement field bitstream (also referred to as a compressed displacement bitstream), a compressed attribute bitstream, and/or the like.

Figure 5:
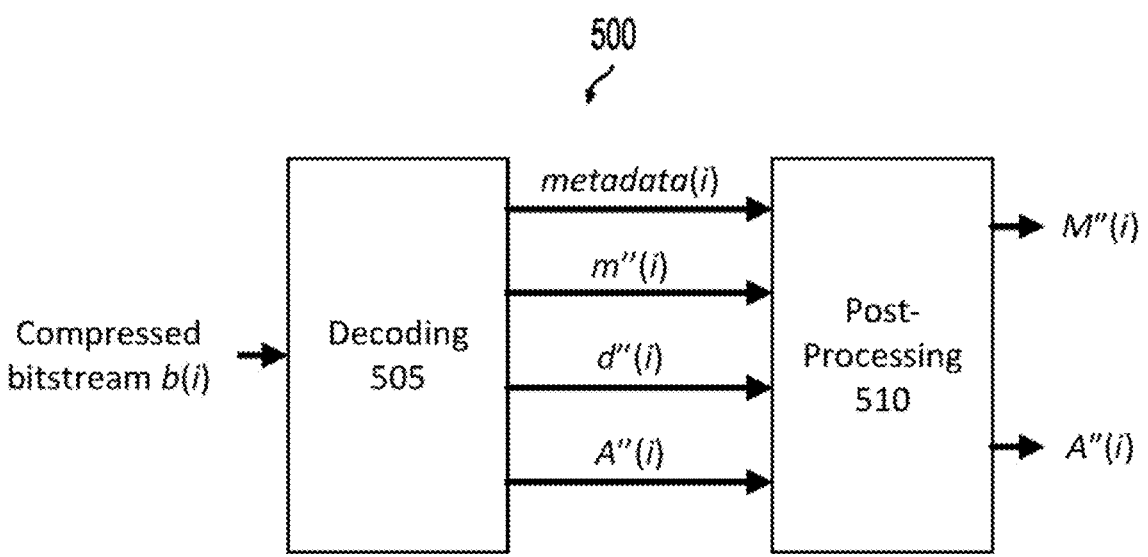
FIG. 5 shows an example of a decoding process for mesh processing according to an aspect of the disclosure.

FIG. 5 shows an example of a decoding process (500) for mesh processing according to an aspect of the disclosure. The decoding process (500) may include a decoding step (505) and a post-processing step (510). A compressed bitstream b(i) may be fed to the decoding step (505). In an example, for a lossless transmission, the compressed bitstream b(i) is the output b(i) from the encoding process (400). The decoding step (505) may extract various sub-bitstreams such as the compressed base mesh sub-stream, the compressed displacement field sub-stream, the compressed attribute sub-stream, and/or the like. The decoding step (505) may decompress the sub-bitstreams to generate the following components: patch metadata indicated by metadata(i), a decoded base mesh m"(i), a decoded displacement field (including displacements) d"(i), a decoded attribute map A"(i), and/or the like.

In an aspect, the base mesh sub-stream may be fed to a mesh decoder to generate a reconstructed quantized base mesh m'(i). The decoded base mesh m"(i) may be obtained by applying an inverse quantization to m'(i). The displacement field sub-stream including packed and quantized wavelet coefficients that are encoded may be decoded by a video and/or image decoder. Image unpacking and inverse quantization may be applied to the packed quantized wavelet coefficients that are reconstructed to obtain the unpacked and dequantized transformed coefficients (e.g., wavelet coefficients). An inverse wavelet transform may be applied to the unpacked and dequantized wavelet coefficients to generate the decoded displacement field d"(i).

The decoded components (e.g., including metadata(i), m"(i), d"(i), A"(i), and/or the like) may be fed to a post-processing step (510). A mesh (also referred to as a decoded mesh) M"(i) may be generated by the post-processing step (510) based on m"(i) and d"(i). In an example, the reconstructed deformed mesh DM(i) may be obtained by subdividing m"(i) using a subdivision scheme and applying the reconstructed displacements d"(i) to vertices of a subdivided mesh. In an example, when the encoding process (400), the decoding process (500), and the transmission are lossless, the mesh M"(i) may be identical to the input mesh M(i). When one of the encoding process (400), the decoding process (500), and the transmission is lossy, M"(i) is different from M(i). In various examples, the difference, if any, between M"(i) and M(i) is relatively small. In an example, an attribute map A"(i) is also generated by the post-processing step (510).

Figure 6:
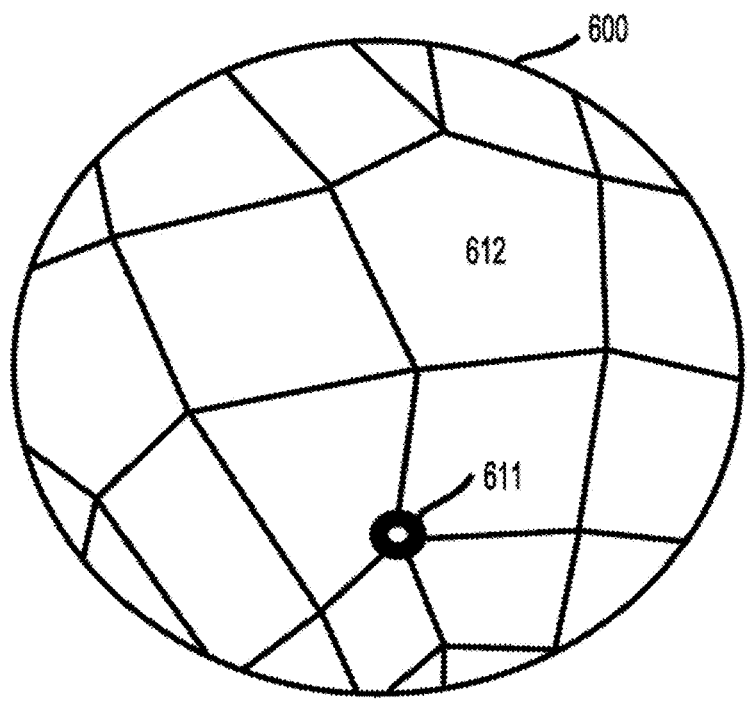
FIG. 6 shows an example of a vertex and a face of a polygon mesh according to an aspect of the disclosure.

A polygon mesh (also interchangeably referred to as a polygonal mesh) may include topologic quantities, such as vertices, edges, and faces, and geometric quantities, such as attributes including vertex positions, face colors, and the like. FIG. 6 shows an example of a vertex (611) and a face (612) of a polygon mesh (600) according to an aspect of the disclosure. The polygon mesh (600) may include a plurality of faces that includes the face (612). The polygon mesh (600) may include a plurality of vertices that includes the vertex (611).

The disclosure describes techniques used in entropy coding, for example, to improve efficiency of entropy coding by adaptively controlling a maximum arithmetic coding range, by encoding of a flip sign bit, and/or the like.

Entropy coding is widely used in data compression including mesh coding, such as polygonal mesh compression (PMC), and the like. Entropy coding such as encoding or decoding coefficients representing residuals (also referred to as residues) or similar quantities can be performed via an entropy coder or an entropy decoder that, for example, operates with M adaptive contexts.

Figure 7:
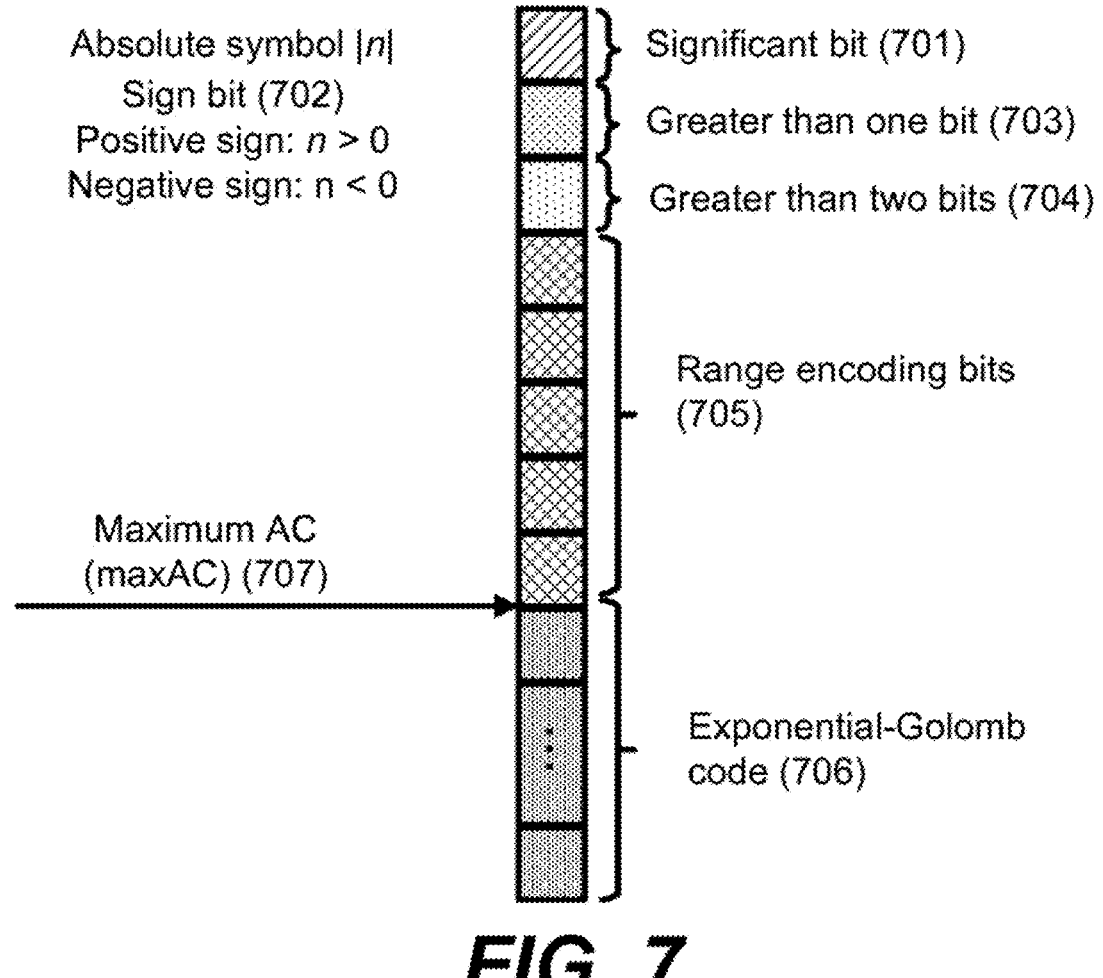
FIG. 7 shows an example of entropy coding according to an aspect of the disclosure.

In an aspect, entropy coding may encode inputs (e.g., input residuals) by taking into account significance (e.g., as indicated by a significant bit), a sign, and a magnitude of each input residual. FIG. 7 shows an example of entropy coding according to an aspect of the disclosure. A significant bit (701), a sign bit (702), a greater than one bit (703), a greater than two bit (704), and one or more range encoding bits (705), an exponential-Golomb code (706), and/or the like may be used to indicate a symbol n. In an example, the symbol n represents a residual. The encoding process may be configured for residuals, such as non-zero residuals, residuals with an absolute value that are greater than one and two. In some examples, values that fall within a range of two and a maximum for arithmetic coding (also referred to as a maximum value for arithmetic coding or 'maxAC') (707) are encoded binary-wise with an adaptive context for each bit, as indicated by the one or more range encoding bits (705). The maximum value for arithmetic coding (707) may be a pre-established maximum for arithmetic coding. In an example, the maximum value for arithmetic coding (707) refers to a maximum number of residual bits encoded using arithmetic coding. In an aspect, an absolute value of the current residual may be coded (e.g., decoded and/or encoded) using the arithmetic coding when the absolute value of the current residual is within a range, such as a range of two to the maximum value for the arithmetic coding. In an example, an absolute value of the current residual is to be decoded using arithmetic coding when the absolute value of the current residual is within a range of two to the maximum value for arithmetic coding and the absolute value of the current residual is to be decoded using another entropy coding method (e.g., an exponential Golomb code) when the absolute value of the current residual is larger than the maximum value for arithmetic coding. In an example, the maxAC (707) is set to 6 bits for both position and attribute residual context.

In an example, referring to FIG. 7, values (e.g., absolute values of respective residuals) that exceed the maximum value for arithmetic coding (or the maxAC) (707) are coded using the exponential Golomb code (706). In some examples, the exponential Golomb coding is efficient for representing symbols with a skewed probability distribution, as the exponential Golomb coding may adjust a code length based on a magnitude of the residual.

For encoding the sign bit (702) for each non-zero symbol (e.g., a non-zero residual) encountered during the encoding process, the sign bit (702) of the non-zero symbol may be encoded with a type of entropy encoding (also referred to as an encoding method or an encoding process that encodes signs) that may maximize a compression efficiency. In an example, the encoding process directly encodes the sign of the non-zero symbol, and the encoding method is referred to as a direct encoding method or a direct sign encoding method. The direct encoding method is described as follows: 1) for a positive symbol: if the symbol is greater than zero (indicating a positive value), the encoder may encode (e.g., emit) a bit of '1' using a context dedicated for sign encoding (signCtx). The sign bit (702) may be coded using context modeling such as context adaptive arithmetic coding (CA-BAC). This operation may signal that the symbol being encoded is positive; 2) for a negative symbol: if the symbol is less than zero (indicating a negative value), the encoder may encode (e.g., emit) a bit of '0' using the same context signCtx, for example, using CABAC. This indicates a negative value for the symbol. Thus, when the direct encoding method is used to encode the sign bit (702), the sign bit (702) is "1" for the positive n and the sign bit (702) is "0" for the negative n.

In some examples, as each coefficient is encoded, the adaptive contexts are dynamically updated to reflect the most current data being processed.

In an aspect, attributes of a mesh (or a polygon mesh) may include vertex positions, texture coordinates, normal vectors, an associated texture map, and/or the like. Geometric attributes such as vertex positions may be coded (e.g., encoded or decoded) according to a traversal order and a predictive coding scheme may be implemented. In an example, a residual vector r between a current position (also referred to as a current vertex position) v of a vertex and a predicted position (also referred to as a predicted vertex position) p of the vertex may be encoded in a bitstream as indicated by Eq. (1).

$$r = v - p \qquad \text{Eq. (1)}$$

The prediction may be formed based on the availability of reference positions which are already encoded. When there is a zero reference, the initial predictor can be a zero vector such as (0, 0, 0) for a 3D vector or (0, 0) for a 2D vector (e.g., a 2D UV coordinate), a center of an input mesh, a center of a bounding box, or the like. When there are one or two references, the last predictor may be used by selecting the last encoded position. When there are more than two reference positions, parallelogram prediction or multiple parallelogram predictions may be used. In an example, a position of mesh vertices in a mesh (e.g., a 3D mesh) or UV coordinates may be predicted by using a fixed value, a previous position or a previous UV coordinate, an average of last n positions or an average of last n UV coordinates, parallelogram prediction(s), reflection prediction(s), and/or the like.

The entropy coding process used in related technology may be improved in efficiency and performance. In an example, a predictor used for coding a position (e.g., a vertex position or a UV coordinate) may not accurately estimate a true value (e.g., a true vector) of the position. In some examples, this inaccuracy may lead to an increased requirement for encoding sign bits, consuming additional bits, and resulting in inefficiency. In an example, a method of signaling sign bits that favors the positive sign may yield better performance, and indicates an uneven sign distribution.

The methods and apparatuses described in the disclosure may be applicable to any form of geometry coding, attribute coding, or the like, irrespective of the underlying polygonal mesh or the traversal algorithm employed. Thus, the methods and apparatuses described in the disclosure may be applicable to any polygonal mesh or any traversal algorithm.

In an aspect, residuals or coefficients are used as an example of an input for entropy coding (e.g., the input to the entropy coder (345) in FIG. 3, the input for the entropy decoder/parser (220) in FIG. 2). The methods and apparatuses described may be applied to other symbols.

According to an aspect of the disclosure, a type of entropy coding for coding a sign may be referred to as a flipped sign coding method. The flipped sign coding method may be applied to code a sign of a current residual in a plurality of residuals, for example, when the current residual is not zero. In an example, the plurality of residuals includes a component of a sequence of residual vectors associated with vertex positions of a mesh (or a polygon mesh). For example, the component of the sequence of residual vectors associated with the vertex positions 1-N of the polygon mesh includes one of a component in a UV coordinate.

In an example, each residual vector may indicate a difference between a current vertex position v and a predicted vertex position p such as shown in Eq. (1). For example, the mesh may include vertices 1, 2, 3, . . . , N, the vertex positions of the vertices 1-N are indicated by $v_1$, $v_2$, $v_3$, . . . , $v_N$, and the residual vectors of the vertices 1-N are indicated by $r_1$, $r_2$, $r_3$, . . . , $r_N$. When each residual vector is a 3D vector, a residual vector $r_i$ may be indicated by ($x_i$, $y_i$, $z_i$) where i may be 1, 2, . . . , N. In an example, the component of the sequence of residual vectors associated with the vertex positions 1-N of the polygon mesh includes an x component $x_1$, $x_2$, $x_3$, . . . , $x_N$ of the sequence of residual vectors $r_1$, $r_2$, $r_3$, . . . , $r_N$. In an example, the component of the sequence of residual vectors associated with the vertex positions 1-N of the polygon mesh includes a y component $y_1$, $y_2$, $y_3$, . . . , $y_N$ of the sequence of residual vectors $r_1$, $r_2$, $r_3$, . . . , $r_N$. In an example, the component of the sequence of residual vectors associated with the vertex positions 1-N of the polygon mesh includes a z component $z_1$, $z_2$, $z_3$, . . . , ZN of the sequence of residual vectors $r_1$, $r_2$, $r_3$, . . . , $r_N$.

In an aspect, instead of directly encoding a sign of a current residual (e.g., a coefficient value, such as a component of a residual vector) that is not 0, a flip sign may be encoded using the flipped sign coding method. For example, the sign of the current residual that is not 0 is encoded based on a previous sign and whether the sign of the current residual is flipped from the previous sign (e.g., whether the sign of the residual is different from the previous sign). Thus, an encoder may assess the sign of the current residual relative to the previous sign. In an example, the previous sign is a sign of a previously encoded value such as a previously encoded non-zero residual according to an encoder order. For example, if the plurality of residuals includes the x component $x_1$, $x_2$, $x_3$, . . . , $x_N$ in the encoding order and the current residual is $x_i$, the previous residual is $x_{j0}$ if $x_{j0}$ is not 0, j0 is less than i, and a difference (i−j0) is the smallest among differences (i−j) where j is less than i. In an example, a sequence of signs associated with the plurality of residuals includes the sign of the current residual and the sign of the previous non-zero residual, and the sign of the current residual and the sign of the previous non-zero residual are adjacent.

In an example, the flipped sign is derived and encoded as: Encode (abs(curSign−prevSign), signCtx). The value "curSign" may refer to a current sign value (e.g., the sign of the current residual) and the value "prevSign" may refer to a previous sign value (e.g., the sign of the previous non-zero residual). If the current sign value is the same as the previous sign value, a bit such as '0' may be encoded; if the current sign value is different from the previous sign value, a bit such as '1' may be encoded. By exploiting a correlation among signs of consecutive non-zero residuals, this method of coding flip signs may reduce redundancy, for example, in sequences where long runs of the same sign frequently occur.

Figure 8:
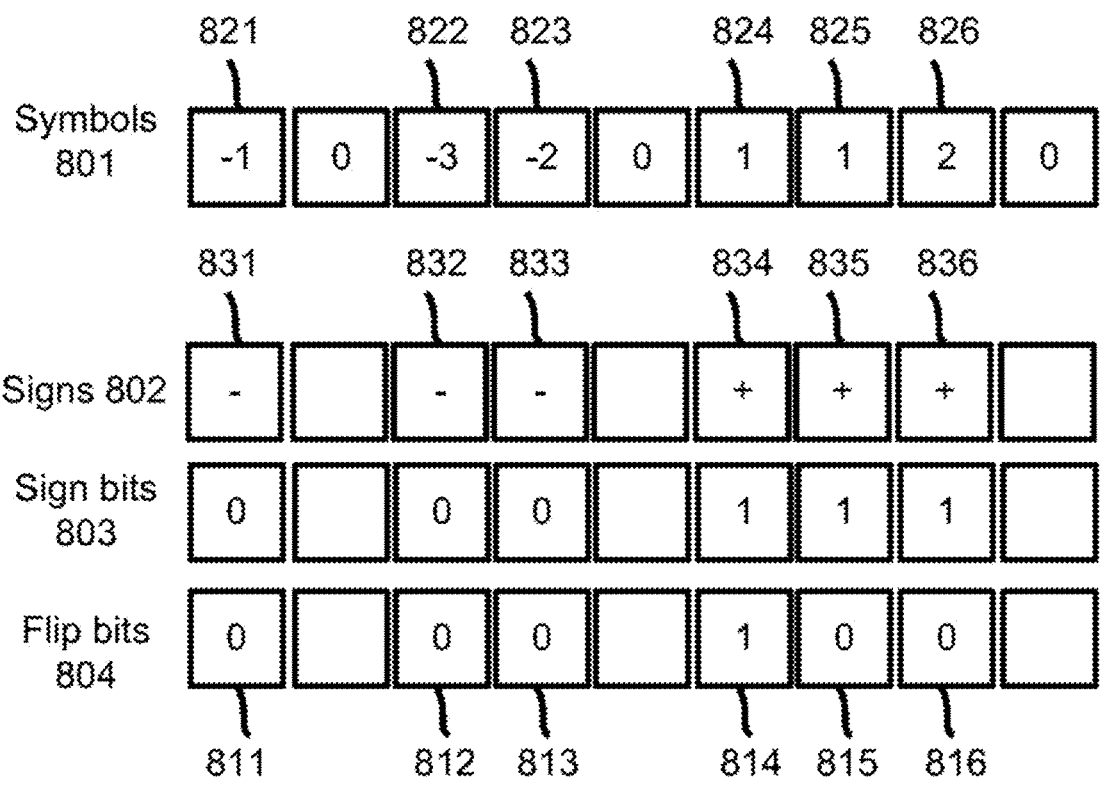
FIG. 8 shows an example of flip sign bits according to an aspect of the disclosure.

FIG. 8 shows an example of flip sign bits according to an aspect of the disclosure. In the example shown in FIG. 8, a sequence of symbols (801) (e.g., a plurality of residuals) includes −1, 0, −3, −2, 0, 1, 1, 2, 0. In an example, the sequence of symbols (801) corresponds to a sequence of the x component $x_1$ to $x_9$ associated with nine vertices. Consecutive non-zero residuals in the sequence of symbols (801) (e.g., the plurality of residuals) include the symbols (821)-(826) (e.g., −1, −3, −2, 1, 1, and 2).

A sequence of signs (also referred to as a sequence of sign values) (802) of the consecutive non-zero residuals (821)-(826) includes signs (831)-(836), such as 3 negative signs (831)-(833) of the symbols −1, −3, and −2, and 3 positive signs (834)-(836) of the symbols 1, 1, and 2.

In an aspect, the signs (831)-(836) are encoded directly using the direct sign encoding method. For example, the 3 negative signs (831)-(833) of the symbols −1, −3, and −2 are encoded using "0" and the 3 positive signs (834)-(836) of the symbols 1, 1, and 2 are encoded using "1" as shown using sign bits (803) which is also referred to as a binary sign sequence or a binary sequence. In the direct sign encoding method, each sign may be coded independently from other signs (e.g., including the previous sign) in the sign bits (803).

In an aspect, the signs (831)-(836) are encoded using the flip sign coding, such as shown in a flip sign sequence (804) that includes flip bits (811)-(816). As described above, in an example, if the current sign value is the same as the previous sign value, a bit '0' is encoded; if the current sign value is different from the previous sign value, a bit '1' is encoded. Referring to FIG. 8, the sequence of signs (802) includes the signs (831)-(836). In an example, the sign (e.g., the sign (832)) of the current residual that is not 0 (e.g., the symbol (822)) is the same as the previous sign value (831), a bit '0' is encoded, for example, the flip bit (812) corresponding to the symbol (822) or the sign (832) is 0. In an example, the sign (e.g., the sign (834)) of the current residual that is not 0 (e.g., the symbol (824)) is different from the previous sign value (833), a bit '1' is encoded, for example, the flip bit (814) corresponding to the symbol (824) or the sign (834) is 1. In the flip sign encoding method, a sign may be coded based on one or more other signs (e.g., the previous sign) in the sign bits (803).

In an aspect, at the beginning of each sequence of sign value coding (e.g., a sequence including signs of the x component $x_1, x_2, x_3, \ldots, x_N$), the first sign in the sequence of signs may be coded assuming the prevSign value is a fixed value, such as 0. Referring to FIG. 8, the first sign in the sequence of signs (802) is the sign (831). The sign (831) is the sign of the current symbol (821). When coding the sign (831), the prevSign value may be set as 0. In an example, the previous sign or the prevSign value is a fixed value when the current residual (e.g., the symbol (821)) is an initial non-zero residual to be encoded prior to encoding remaining residuals in the plurality of residuals.

In an example, referring to FIG. 8, the plurality of residuals or the sequence of symbols (801) includes an initial non-zero residual (e.g., the symbol (821)) to be encoded prior to encoding remaining non-zero residuals in the plurality of residuals). When the current residual (e.g., the symbol (822) in FIG. 8) is not the initial non-zero residual (e.g., the symbol (821)), the previous sign is a sign of a previous non-zero residual (e.g., the symbol (821)) in the plurality of residuals according to an encoding order. The sequence of signs (802) associated with the plurality of residuals includes the sign (e.g., (832)) of the current residual (e.g., (822)) and the sign (831) of the previous non-zero residual (e.g., (821)) that are adjacent in the sequence of signs (802).

In an aspect, the flipped sign coding may be restarted after every set of symbols (e.g., N residuals), for example, to break the dependency and a new sequence of sign value coding may start from the next symbol (e.g., the next residual). In an example, the N symbols include the sequence of symbols (801). The restart of the flip sign coding for each set of symbols may enable parallel encoding among multiple sign coding sequences. In an example, the flipped sign coding may be restarted after every N non-zero residuals. An example of one sequence of signs is the sequence of signs (802) in FIG. 8. In an example, the flipped sign coding may be restarted after every N signs in a sequence of signs.

In an example, the flip sign coding method is applied to the plurality of residuals including N first residuals. For each first non-zero residual that is different from the current residual and the initial non-zero residual, a sign of the first non-zero residual is determined based on a sign of a previous non-zero residual of the first non-zero residual according to the encoding order and whether the sign of the first non-zero residual is flipped from the sign of the previous non-zero residual of the first non-zero residual.

In an example, the flip sign coding method is applied to a second plurality of residuals including N second residuals. For each second non-zero residual in a second plurality of residuals, a sign of the second residual in the second plurality of residuals is determined based on a sign of a previous non-zero residual of the second residual according to the encoding order and whether the sign of the second residual is flipped from the sign of the previous non-zero residual of the second residual. The plurality of residuals and the second plurality of residuals are different.

In an aspect, the flipped sign may be restarted when a new prediction set of position coding of vertices is enabled. A new sequence of flipped sign value coding may start from the next symbol (e.g., the next residual, the next coefficient, or the like) that is associated with the new prediction set for the position coding of vertices.

If the sign bits are collectively located (e.g., the same signs are consecutive), the flip sign bit coding method may significantly reduce the entropy, and thus improve coding efficiency for the sign coding in the entropy coding. In an example, the flip sign bit encoding method may be beneficial for geometry residuals of quad dominant meshes and may be enabled for the quad dominant meshes.

In an aspect, an adaptive flipped sign encoding technique may be applied. For example, a systematic approach is applied to decide when to employ the flipped sign encoding technique within an entropy coding framework. In some examples, whether to apply the flipped sign encoding technique including the decision to apply the flipped sign encoding technique may be signaled.

Entropy for the direct sign encoding method (also referred to as direct sign entropy) where the signs are encoded directly and entropy for the flipped sign encoding method (also referred to as flipped sign entropy) may be calculated.

Residual signs (e.g., signs of a plurality of residuals) may be determined (e.g., collected). In an example, for the last N encoded residuals (such as the last N encoded non-zero residuals), the signs (e.g., positive or negative) may be recorded as a binary sequence, where '1' may represent the positive sign and '0' may represent the negative sign, or vice versa. In an example, such as shown in FIG. 8, the last N encoded residual may include the sequence of symbols (801), and the sequence of signs (802) may be recorded as a binary sequence including 0, 0, 0, 1, 1, and 1 such as shown in the binary sign sequence (803).

The direct sign entropy may be calculated. The entropy of the binary sequence (e.g., 0, 0, 0, 1, 1, and 1 as shown in FIG. 8) may be computed as it stands, which represents the entropy under the direct sign encoding method. The entropy H for the binary sequence may be calculated using Eq. (2).

$$H = -p_0 \log_2(p_0) - p_1 \log_2(p_1) \qquad \text{Eq. (2)}$$

$p_0$ and $p_1$ are the probabilities of '0' and '1' in the binary sequence, respectively.

The flipped sign entropy may be calculated as follows. In an aspect, a flipped sign sequence may be generated. The original sign sequence (e.g., the sign sequence (803)) may be transformed into a flip sign sequence (e.g., the flip sign sequence (804)) by marking a '1' for each flip of signs (e.g., a sign change compared to the previous sign) and marking a '0' where there is no flip of signs (e.g., no sign change compared to the previous sign). The flipped sign entropy may be calculated as follows. The entropy of the flip sign sequence may be computed using the same method as shown in Eq. (2) for the direct sign sequence. The result gives an entropy value representative of the flip sign encoding method. Thus, referring to FIG. 8, the direct sign entropy may be calculated based on Eq. (2) and the sequence (803), and the flip sign entropy may be calculated based on Eq. (2) and the sequence (804).

Suitable decision criteria may be used to select the entropy coding method between the direct sign encoding method or the flip sign encoding method. In an aspect, entropies such as the direct sign entropy and the flip sign entropy may be compared to determine which encoding method (e.g., the direct sign encoding method or the flip sign encoding method) has a lower entropy value. The method with the lower entropy may be determined as more efficient in terms of compression, as the method with the lower entropy represents a more predictable (and thus more compressible) pattern.

A threshold for switching of the entropy encoding method may be set to account for an overhead of switching the entropy encoding methods and signaling the entropy encoding method (signaling the switching of the entropy encoding method) to the decoder. In an example, if the difference in entropy between the two methods (e.g., the direct sign encoding method or the flip sign encoding method) exceeds the threshold, it may signify a substantial gain in coding efficiency, which may warrant a switch to the flip sign method. The threshold may be any suitable value. In an example, the threshold is zero.

If a previous entropy encoding method is the direct sign encoding method, and the difference (e.g., the direct sign entropy—the flip sign entropy) exceeds the threshold, then the entropy encoding method is switched from the direct sign encoding method to the flip sign encoding method.

If the previous entropy encoding method is the entropy encoding method, and the difference (e.g., the direct sign entropy—the flip sign entropy) exceeds the threshold, then the entropy encoding method is not switched from the flip sign encoding method, and the entropy encoding method remains to be the flip sign encoding method.

Which sign coding method is applied may be signaled or derived. In an aspect, explicit signaling may be used. A flag (e.g., a flip sign flag) may be signaled in a bitstream to signal the switch between the encoding methods. In an example, the flag is signaled after every N encoded residuals. In this case, the decoder does not need to perform the above calculations to determine whether to switch the encoding methods. For example, the coded information in the bitstream indicates the flip sign flag for a second plurality of residuals. The flip sign flag indicates whether a second entropy coding method (also referred to as a second type of entropy coding) for the second plurality of residuals is to be switched from the entropy coding method (also referred to as the type of entropy coding) for the plurality of residuals. The plurality of residuals and the second plurality of residuals are different, and the plurality of residuals may be decoded prior to (e.g., immediately prior to) decoding the second plurality of residuals.

At a decoder side, for each first non-zero residual that is different from the current residual and the initial non-zero residual, the flip sign coding method is applied. The flip sign coding method is applied, for example, by determining a sign of the first non-zero residual based on a sign of a previous non-zero residual of the first residual according to the decoding order and a syntax element indicating whether the sign of the first non-zero residual is flipped from the sign of the previous non-zero residual of the first residual. When the flip sign flag indicates that the second entropy coding method for the second plurality of residuals is to be switched from the entropy coding method for the plurality of residuals, for each second non-zero residual in the second plurality of residuals, a sign of the second non-zero residual in the second plurality of residuals may be determined directly without using a sign of a previous non-zero residual of the second residual according to the decoding order. When the flip sign flag indicates that the second entropy coding method for the second plurality of residuals is not to be switched from the entropy coding method for the plurality of residuals, for each second non-zero residual in the second plurality of residuals, a sign of the second non-zero residual in the second plurality of residuals is determined based on a sign of a previous non-zero residual of the second residual according to the decoding order and a second syntax element indicating whether the sign of the second non-zero residual is flipped from the sign of the previous non-zero residual of the second residual.

In an aspect, a flag may be derived. Thus, the flip sign flag is not signaled, and whether to switch the encoding methods may be derived by the decoder. For encoding efficiency, the decoder may repeat the entropy calculation and the decision process to avoid the signaling overhead. In an example, the decoder performs the same calculation for every N residuals as the encoder.

In an example, at a decoder side, the flip sign coding method is applied to the plurality of residuals. For each first non-zero residual that is different from the current residual and the initial non-zero residual, a sign of the first non-zero residual is determined based on a sign of a previous non-zero residual of the first residual according to the decoding order and a syntax element indicating whether the sign of the first non-zero residual is flipped from the sign of the previous non-zero residual of the first residual. Whether a second entropy coding method for the second plurality of residuals is to be switched from the entropy coding method for the plurality of residuals may be determined. When the second entropy coding method is determined to be switched from the entropy coding method for the plurality of residuals, for each second non-zero residual in the second plurality of residuals, a sign of the second non-zero residual in the second plurality of residuals is determined directly and without using a sign of a previous non-zero residual of the second residual according to the decoding order. When the second entropy coding method is determined not to be switched from the entropy coding method, for each second non-zero residual in the second plurality of residuals, a sign of the second non-zero residual in the second plurality of residuals is determined based on a sign of a previous non-zero residual of the second residual according to the decoding order and a second syntax element indicating whether the sign of the second non-zero residual is flipped from the sign of the previous non-zero residual of the second residual.

In an aspect, a pre-analysis may be conducted to determine the flip sign flag at a mesh level. For example, the flip sign flag is determined for the entire mesh. In an example, the flip sign flag is enabled for a mesh that is higher than a triangular mesh. The mesh that is higher than the triangular mesh may be a quad mesh, a pentagon mesh, or the like. For example, the mesh incudes a triangular mesh and a quad mesh, the flip sign coding method may be adaptively applied to the quad mesh, but not the triangular mesh.

In some examples, when significant variability occurs in a range of a plurality of residuals, optimizing entropy coding may be challenging. The variability in the range of the plurality of residuals may, for example, depend on (e.g., may be directly influenced) by an input bit depth and characteristics of geometry and attribute values. When the bit depth increases, the range of residuals may increase, which may lead to inefficiencies in related entropy coding methods that do not account for such variability. Thus, an encoding strategy that is more optimal for one bit depth may not be as effective for another bit depth. The disclosure describes an adaptive maximum arithmetic coding method, which may be applicable to any suitable form of geometry coding or attribute coding, irrespective of the underlying polygonal mesh or the traversal algorithm. In an aspect, residuals or coefficients are used as an input for the entropy coding.

In an aspect, the maximum value for arithmetic coding (e.g., the maxAC) may be dynamically determined based on the bit depth of the input values (e.g., a plurality of residuals). For example, the maximum value for the arithmetic coding is based on a bit depth associated with the current residual. This adaptive setting of the maxAC allows the entropy coding algorithm to finely tune parameters for each specific data set (e.g., the plurality of residuals) and accommodate statistical characteristics that come with different bit depths.

In an example, the adaptive maximum AC value determination is described below. For inputs with a higher bit depth value which may imply a wider range of values, the maxAC may increase accordingly. For example, when an input data bit depth M is larger than an input data bit depth N, the corresponding maxAC (M) being larger than the maxAC (N) may be set. This adaptation may enable the encoding of larger residuals without an excessive bit rate overhead, ensuring that the probabilities of larger values are more accurately represented within the encoding context. In an example, the maximum value for the arithmetic coding that is applicable to the current residual (e.g., the maxAC (current residual)) is larger than a maximum value for the arithmetic coding that is applicable to another residual (e.g., the maxAC (the other residual)) in a second plurality of residuals when the bit depth associated with the current residual is larger than a bit depth associated with the other residual.

In an example, for inputs with a lower bit depth which may indicate a narrower range of values, the maxAC may decrease accordingly. For example, when the input data bit depth M is less than the input data bit depth N, the corresponding maxAC (M) being less than the maxAC (N) may be set. Accordingly, the entropy coding scheme does not need to allocate unnecessary bits for highly improbable large values, and thus maintaining the coding efficiency.

In an aspect, the maxAC is defined using Eq. (3)

$$maxAC = 2^{maxBits} - 1 \qquad \text{Eq. (3)}$$

where, maxBits is constrained by the input bitdepth (bitDepth) using Eq. (4)

$$maxBits = \text{Clip}(bitDepth - \text{offset}) \qquad \text{Eq. (4)}$$

where offset is a value determined empirically or through analysis of a typical range of residuals for a given bit depth, whether the coding is the geometry coding or the attribute coding, an application domain (e.g., for games, for industry, for manufacturing, or other applications). In an example, the offset is hard-coded in both the encoder and the decoder. In an example, the offset is signaled to the decoder. The offset may help avoid the inefficiency of coding extremely rare and large values and providing an enough range for the majority of the residuals encountered. In one example, the offset is set to 8.

In an aspect, an enhanced adaptive maximum arithmetic coding method may be applied. In this aspect, the optimal maxAC for a particular content to be coded may be estimated at the encoder and signaled in the bitstream. The optimal maxAC may be derived by estimating the bit based on the corresponding context using suitable methods. A first method is referred to as a two-pass coding method in some examples. In a first pass, the optimal maxAC may be calculated using one of the methods described above. In a second pass, the data may be encoded using the derived maxAC and the derived maxAC value may be signaled to the decoder at the beginning of the encoded stream. In an example, the first method may be used for the entire mesh, and the derived maxAC value is only signaled one time. In an example, the maximum value for the arithmetic coding (or the maxAC) is applicable to the mesh including the plurality of residuals, and the coded information includes a syntax element indicating the maximum value for the arithmetic coding for the mesh.

A second method is referred to as a single-pass coding in some examples. In some examples, for real-time or streaming applications, the previously encoded residuals may be analyzed and the maxAC may be updated at given intervals, such as updating the estimated maxAC after every N residuals have been encoded. When a new maxAC (or an updated maxAC) is determined, the new maxAC may be signaled to the decoder, enabling adaptive changes during a decoding process. In an example, the maxAC may be signaled for every N residuals. In an example, the maximum value for the arithmetic coding (or the maxAC) is applicable to the plurality of residuals (e.g., N residuals), and the coded information includes a syntax element indicating the maximum value for the arithmetic coding.

In an example, the maximum value for the arithmetic coding (or the maxAC) being applicable to the current residual in the plurality of residuals is determined based on the bit depth associated with the current residual.

In an example, the maximum value for the arithmetic coding further depends on the offset, such as shown in Eq. (4).

FIG. 9 shows a flow chart outlining a process (900) according to an aspect of the disclosure. The process (900) can be used in an apparatus. The apparatus may include a mesh decoder, such as a video decoder. The video decoder may be configured for mesh compression. In various aspects, the process (900) is executed by processing circuitry, such as the processing circuitry that performs functions of the video decoder (110), the processing circuitry that performs functions of the video decoder (210), the mesh decoder, and/or the like. In some aspects, the process (900) is implemented in software instructions, thus when the processing circuitry executes the software instructions, the processing circuitry performs the process (900). The process starts at (S901) and proceeds to (S910).

At (S910), coded information of a bitstream of a mesh may be received. The bitstream includes a plurality of residuals of the mesh. The plurality of residuals is entropy coded.

At (S920), entropy decoding may be performed on a current residual in the plurality of residuals based on a maximum value for arithmetic coding and a type of entropy coding for a sign of the current residual in the plurality of residuals. In an example, the current residual is not 0. In an example, an absolute value of the current residual is to be decoded using the arithmetic coding when the absolute value of the current residual is within a range of two to the maximum value for the arithmetic coding.

In an aspect, the sign of the current residual is determined using the flip sign coding method, for example, based on a previous sign and whether the sign of the current residual is flipped from the previous sign.

In an example, the sign of the current residual in the plurality of residuals is determined based on the previous sign and a syntax element indicating whether the sign of the current residual is flipped from the previous sign.

In an example, when the current residual is not an initial non-zero residual to be decoded prior to decoding remaining non-zero residuals in the plurality of residuals, the previous sign is a sign of a previous non-zero residual in the plurality of residuals according to a decoding order. A sequence of signs associated with the plurality of residuals includes the sign of the current residual and the sign of the previous non-zero residual that are adjacent.

In an example, the syntax element indicates a value of abs(curSign-prevSign), the curSign represents a value of the sign of the current residual, and the prevSign represents the sign of the previous non-zero residual.

In an example, the previous sign is a fixed value when the current residual is an initial non-zero residual to be decoded prior to decoding remaining non-zero residuals in the plurality of residuals.

In an example, for each first non-zero residual that is different from the current residual and the initial non-zero residual, a sign of the first non-zero residual is determined based on a sign of a previous non-zero residual of the first non-zero residual according to the decoding order and a syntax element indicating whether the sign of the first non-zero residual is flipped from the sign of the previous non-zero residual of the first non-zero residual. For each second non-zero residual in a second plurality of residuals, a sign of the second non-zero residual in the second plurality of residuals is determined based on a sign of a previous non-zero residual of the second non-zero residual according to the decoding order and a second syntax element indicating whether the sign of the second non-zero residual is flipped from the sign of the previous non-zero residual of the second non-zero residual. The plurality of residuals and the second plurality of residuals are different.

In an example, the plurality of residuals and the second plurality of residuals each has a size of N.

In an example, the plurality of residuals includes a component of a sequence of residual vectors associated with vertex positions of the mesh. Each residual vector indicates a difference between a current vertex position and a predicted vertex position.

In an example, the coded information indicates a flip sign flag for a second plurality of residuals, the flip sign flag indicates whether a second type of entropy coding for the second plurality of residuals is to be switched from the type of entropy coding for the plurality of residuals, and the plurality of residuals and the second plurality of residuals are different. For each first non-zero residual that is different from the current residual and the initial non-zero residual, a sign of the first non-zero residual is determined based on a sign of a previous non-zero residual of the first non-zero residual according to the decoding order and a syntax element indicating whether the sign of the first non-zero residual is flipped from the sign of the previous non-zero residual of the first non-zero residual. When the flip sign flag indicates that the second type of entropy coding for the second plurality of residuals is to be switched from the type of entropy coding for the plurality of residuals, for each second non-zero residual in the second plurality of residuals, a sign of the second non-zero residual in the second plurality of residuals is determined directly and without using a sign of a previous non-zero residual of the second non-zero residual according to the decoding order. When the flip sign flag indicates that the second type of entropy coding for the second plurality of residuals is not to be switched from the type of entropy coding for the plurality of residuals, for each second non-zero residual in the second plurality of residuals, a sign of the second non-zero residual in the second plurality of residuals is determined based on a sign of a previous non-zero residual of the second non-zero residual according to the decoding order and a second syntax element indicating whether the sign of the second non-zero residual is flipped from the sign of the previous non-zero residual of the second non-zero residual.

In an example, for each first non-zero residual that is different from the current residual and the initial non-zero residual, a sign of the first non-zero residual is determined based on a sign of a previous non-zero residual of the first non-zero residual according to the decoding order and a syntax element indicating whether the sign of the first non-zero residual is flipped from the sign of the previous non-zero residual of the first non-zero residual. Whether a second type of entropy coding for a second plurality of residuals is to be switched from the type of entropy coding for the plurality of residuals is determined. The plurality of residuals and the second plurality of residuals are different. When the second type of entropy coding is determined to be switched from the type of entropy coding for the plurality of residuals, for each second non-zero residual in the second plurality of residuals, a sign of the second non-zero residual in the second plurality of residuals is determined directly without using a sign of a previous non-zero residual of the second non-zero residual according to the decoding order. When the second type of entropy coding is determined not to be switched from the type of entropy coding, for each second non-zero residual in the second plurality of residuals, a sign of the second non-zero residual in the second plurality of residuals is determined based on a sign of a previous non-zero residual of the second non-zero residual according to the decoding order and a second syntax element indicating whether the sign of the second non-zero residual is flipped from the sign of the previous non-zero residual of the second non-zero residual.

In an aspect, the maximum value for the arithmetic coding (the maxAC) is based on a bit depth associated with the current residual.

In an example, the maximum value for the arithmetic coding that is applicable to the current residual is larger than a maximum value for the arithmetic coding that is applicable to a second residual in a second plurality of residuals when the bit depth associated with the current residual is larger than a bit depth associated with the second residual.

In an example, the maximum value for the arithmetic coding further depends on an offset.

In an example, the maximum value for the arithmetic coding is applicable to the plurality of residuals, and the coded information includes a syntax element indicating the maximum value for the arithmetic coding.

In an example, the maximum value for the arithmetic coding is applicable to the mesh including the plurality of residuals, and the coded information includes a syntax element indicating the maximum value for the arithmetic coding for the mesh.

At (S930), the mesh may be reconstructed based on the entropy decoded current residual.

Then, the process proceeds to (S999) and terminates.

The process (900) can be suitably adapted. Step(s) in the process (900) can be modified and/or omitted. Additional step(s) can be added. Any suitable order of implementation can be used.

Figure 10:
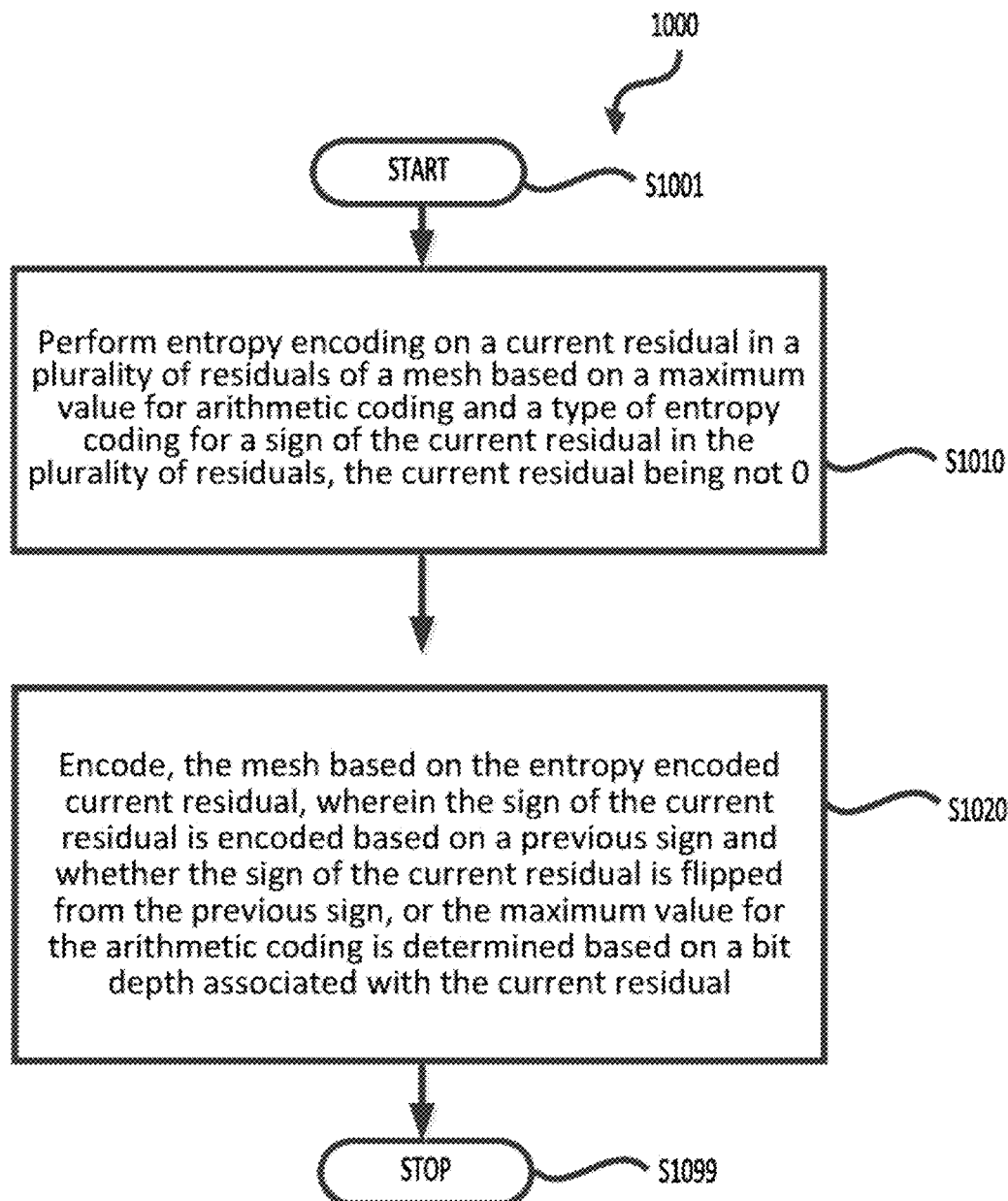
FIG. 10 shows a flow chart outlining an encoding process according to some aspects of the disclosure.

FIG. 10 shows a flow chart outlining a process (1000) according to an aspect of the disclosure. The process (1000) can be used in an apparatus. The apparatus may include a mesh encoder, such as a video encoder. The video encoder may be configured for mesh compression. In various aspects, the process (1000) is executed by processing circuitry, such as the processing circuitry that performs functions of the video encoder (103), the processing circuitry that performs functions of the video encoder (303), the mesh encoder, and/or the like. In some aspects, the process (1000) is implemented in software instructions, thus when the processing circuitry executes the software instructions, the processing circuitry performs the process (1000). The process starts at (S1001) and proceeds to (S1010).

At (S1010), entropy encoding on a current residual in a plurality of residuals of a mesh may be performed based on a maximum value for arithmetic coding and a type of entropy coding for a sign of the current residual in the plurality of residuals. In an example, the current residual is not 0. In an aspect, an absolute value of the current residual is to be encoded using the arithmetic coding when the absolute value of the current residual is within a range of two to the maximum value for the arithmetic coding.

In an aspect, the sign of the current residual is encoded based on a previous sign and whether the sign of the current residual is flipped from the previous sign.

In an aspect, the maximum value for the arithmetic coding is determined based on a bit depth associated with the current residual.

In an example, the sign of the current residual in the plurality of residuals is encoded based on the previous sign and whether the sign of the current residual is flipped from the previous sign.

In an example, when the current residual is not an initial non-zero residual to be encoded prior to encoding remaining non-zero residuals in the plurality of residuals, the previous sign is a sign of a previous non-zero residual in the plurality of residuals according to an encoding order.

In an example, the plurality of residuals includes a component of a sequence of residual vectors associated with vertex positions of the mesh, and each residual vector indicates a difference between a current vertex position and a predicted vertex position.

In an example, the maximum value for the arithmetic coding is determined based on the bit depth associated with the current residual.

At (S1020), the mesh may be encoded based on the entropy encoded current residual.

Then, the process proceeds to (S1099) and terminates.

The process (1000) can be suitably adapted. Step(s) in the process (1000) can be modified and/or omitted. Additional step(s) can be added. Any suitable order of implementation can be used.

In an aspect, a method of processing a mesh includes processing a bitstream of the mesh according to a format rule. For example, the bitstream is a bitstream that is decoded/encoded in any of the decoding and/or encoding methods described herein. The bitstream includes a plurality of residuals of the mesh. The plurality of residuals is entropy coded. The format rule may specify one or more constraints of the bitstream and/or one or more processes to be performed by the decoder and/or encoder. The format rule specifies that: entropy decoding is performed on a current residual that is not 0 in the plurality of residuals based on a maximum value for arithmetic coding and a type of entropy coding for a sign of the current residual in the plurality of residuals; an absolute value of the current residual is to be decoded using the arithmetic coding when the absolute value of the current residual is within a range of two to the maximum value for the arithmetic coding; the mesh is reconstructed based on the entropy decoded current residual; and the sign of the current residual is determined based on a previous sign and whether the sign of the current residual is flipped from the previous sign, or the maximum value for the arithmetic coding is based on a bit depth associated with the current residual.

The methods, aspects, and examples in the disclosure may be used separately or combined in any order. For example, some aspects and/or examples performed by the decoder may be performed by the encoder and vice versa. Each of the methods (or aspects), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 11 shows a computer system (1100) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
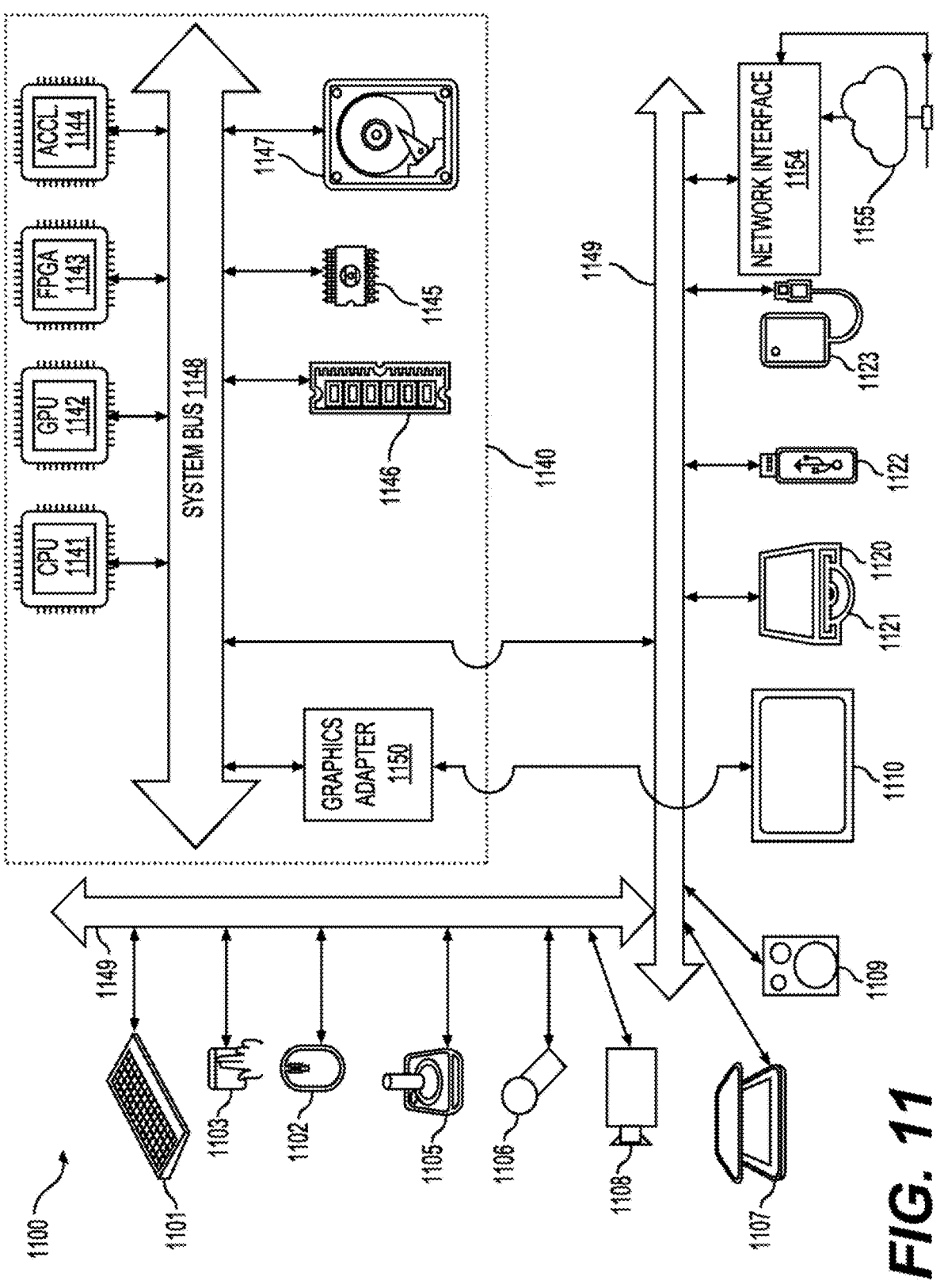
FIG. 11 is a schematic illustration of a computer system in accordance with an aspect.

The components shown in FIG. 11 for computer system (1100) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various aspects of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method for decoding, the method including: receiving coded information of a bitstream of a mesh, the bitstream including a plurality of residuals of the mesh, the plurality of residuals being entropy coded; performing entropy decoding on a current residual in the plurality of residuals based on a maximum value for arithmetic coding and a type of entropy coding for a sign of the current residual in the plurality of residuals, the current residual not being 0, in which an absolute value of the current residual is to be decoded using the arithmetic coding when the absolute value of the current residual is within a range of two to the maximum value for the arithmetic coding; and reconstructing the mesh based on the entropy decoded current residual, in which the sign of the current residual is determined based on a previous sign and whether the sign of the current residual is flipped from the previous sign, or the maximum value for the arithmetic coding is based on a bit depth associated with the current residual (2) The method of feature (1), in which the sign of the current residual in the plurality of residuals is determined based on the previous sign and a syntax element indicating whether the sign of the current residual is flipped from the previous sign.

(3) The method of feature (1) or feature (2), in which when the current residual is not an initial non-zero residual to be decoded prior to decoding remaining non-zero residuals in the plurality of residuals, the previous sign is a sign of a previous non-zero residual in the plurality of residuals according to a decoding order, a sequence of signs associated with the plurality of residuals including the sign of the current residual and the sign of the previous non-zero residual that are adjacent.

(4) The method of any of features (1) to (3), in which the syntax element indicates a value of abs(curSign-prevSign), the curSign represents a value of the sign of the current residual, the prevSign represents the sign of the previous non-zero residual.

(5) The method of any of features (1) to (4), in which the previous sign is a fixed value when the current residual is an initial non-zero residual to be decoded prior to decoding remaining non-zero residuals in the plurality of residuals.

(6) The method of any of features (1) to (5), in which for each first non-zero residual that is different from the current residual and the initial non-zero residual, determining a sign of the first non-zero residual based on a sign of a previous non-zero residual of the first non-zero residual according to the decoding order and a syntax element indicating whether the sign of the first non-zero residual is flipped from the sign of the previous non-zero residual of the first non-zero residual; and for each second non-zero residual in a second plurality of residuals, determining a sign of the second non-zero residual in the second plurality of residuals based on a sign of a previous non-zero residual of the second non-zero residual according to the decoding order and a second syntax element indicating whether the sign of the second non-zero residual is flipped from the sign of the previous non-zero residual of the second non-zero residual, the plurality of residuals and the second plurality of residuals being different.

(7) The method of any of features (1) to (6), in which the plurality of residuals includes a component of a sequence of residual vectors associated with vertex positions of the mesh, and each residual vector indicates a difference between a current vertex position and a predicted vertex position.

(8) The method of any of features (1) to (3), in which the coded information indicates a flip sign flag for a second plurality of residuals, the flip sign flag indicating whether a second type of entropy coding for the second plurality of residuals is to be switched from the type of entropy coding for the plurality of residuals, the plurality of residuals and the second plurality of residuals being different; for each first non-zero residual that is different from the current residual and the initial non-zero residual, determining a sign of the first non-zero residual based on a sign of a previous non-zero residual of the first non-zero residual according to the decoding order and a syntax element indicating whether the sign of the first non-zero residual is flipped from the sign of the previous non-zero residual of the first non-zero residual; when the flip sign flag indicates that the second type of entropy coding for the second plurality of residuals is to be switched from the type of entropy coding for the plurality of residuals, for each second non-zero residual in the second plurality of residuals, determining a sign of the second non-zero residual in the second plurality of residuals directly and without using a sign of a previous non-zero residual of the second non-zero residual according to the decoding order; and when the flip sign flag indicates that the second type of entropy coding for the second plurality of residuals is not to be switched from the type of entropy coding for the plurality of residuals, for each second non-zero residual in the second plurality of residuals, determining a sign of the second non-zero residual in the second plurality of residuals based on a sign of a previous non-zero residual of the second non-zero residual according to the decoding order and a second syntax element indicating whether the sign of the second non-zero residual is flipped from the sign of the previous non-zero residual of the second non-zero residual.

(9) The method of any of features (1) to (3), in which for each first non-zero residual that is different from the current residual and the initial non-zero residual, determining a sign of the first non-zero residual based on a sign of a previous non-zero residual of the first non-zero residual according to the decoding order and a syntax element indicating whether the sign of the first non-zero residual is flipped from the sign of the previous non-zero residual of the first non-zero residual; the method includes determining whether a second type of entropy coding for a second plurality of residuals is to be switched from the type of entropy coding for the plurality of residuals, the plurality of residuals and the second plurality of residuals being different; when the second type of entropy coding is determined to be switched from the type of entropy coding for the plurality of residuals, for each second non-zero residual in the second plurality of residuals, determining a sign of the second non-zero residual in the second plurality of residuals directly without using a sign of a previous non-zero residual of the second non-zero residual according to the decoding order; and when the second type of entropy coding is determined not to be switched from the type of entropy coding, for each second non-zero residual in the second plurality of residuals, determining a sign of the second non-zero residual in the second plurality of residuals based on a sign of a previous non-zero residual of the second non-zero residual according to the decoding order and a second syntax element indicating whether the sign of the second non-zero residual is flipped from the sign of the previous non-zero residual of the second non-zero residual.

(10) The method of any of features (1) to (9), in which the maximum value for the arithmetic coding is determined based on the bit depth associated with the current residual.

(11) The method of any of features (1) to (10), in which the maximum value for the arithmetic coding that is applicable to the current residual is larger than a maximum value for the arithmetic coding that is applicable to a second residual in a second plurality of residuals when the bit depth associated with the current residual is larger than a bit depth associated with the second residual.

(12) The method of any of features (1) to (11), in which the maximum value for the arithmetic coding depends on an offset.

(13) The method of any of features (1) to (12), in which the maximum value for the arithmetic coding is applicable to the plurality of residuals, and the coded information includes a syntax element indicating the maximum value for the arithmetic coding.

(14) The method of any of features (1) to (13), in which the maximum value for the arithmetic coding is applicable to the mesh including the plurality of residuals, and the coded information includes a syntax element indicating the maximum value for the arithmetic coding for the mesh.

(15) A method for encoding, the method including: performing entropy encoding on a current residual in a plurality of residuals of a mesh based on a maximum value for arithmetic coding and a type of entropy coding for a sign of the current residual in the plurality of residuals, the current residual being not 0, in which an absolute value of the current residual is to be encoded using the arithmetic coding when the absolute value of the current residual is within a range of two to the maximum value for the arithmetic coding; and encoding the mesh based on the entropy encoded current residual, in which the sign of the current residual is encoded based on a previous sign and whether the sign of the current residual is flipped from the previous sign, or the maximum value for the arithmetic coding is determined based on a bit depth associated with the current residual.

(16) The method of feature (15), in which the sign of the current residual in the plurality of residuals is encoded based on the previous sign and whether the sign of the current residual is flipped from the previous sign.

(17) The method of feature (15) or (16), in which when the current residual is not an initial non-zero residual to be encoded prior to encoding remaining non-zero residuals in the plurality of residuals, the previous sign is a sign of a previous non-zero residual in the plurality of residuals according to an encoding order.

(18) The method of any of features (15) to (17), in which the plurality of residuals includes a component of a sequence of residual vectors associated with vertex positions of the mesh, and each residual vector indicates a difference between a current vertex position and a predicted vertex position.

(19) The method of any of features (15) to (18), in which the maximum value for the arithmetic coding is determined based on the bit depth associated with the current residual.

(20) A method of processing a mesh, the method including: processing a bitstream of the mesh according to a format rule. The bitstream includes a plurality of residuals of the mesh, the plurality of residuals being entropy coded. The format rule specifies that: entropy decoding is performed on a current residual that is not 0 in the plurality of residuals based on a maximum value for arithmetic coding and a type of entropy coding for a sign of the current residual in the plurality of residuals; an absolute value of the current residual is to be decoded using the arithmetic coding when the absolute value of the current residual is within a range of two to the maximum value for the arithmetic coding; the mesh is reconstructed based on the entropy decoded current residual; and the sign of the current residual is determined based on a previous sign and whether the sign of the current residual is flipped from the previous sign, or the maximum value for the arithmetic coding being applicable to the current residual is based on a bit depth associated with the current residual.

(21) An apparatus for decoding, including processing circuitry that is configured to perform the method of any of features (1) to (14).

(22) An apparatus for encoding, including processing circuitry that is configured to perform the method of any of features (15) to (19).

(23) A non-transitory computer-readable storage medium storing instructions which when executed by at least one processor cause the at least one processor to perform the method of any of features (1) to (20).

What is claimed is:

1. A method for decoding, the method comprising:

receiving coded information of a bitstream of a mesh, the bitstream including a plurality of residuals of the mesh, the plurality of residuals being entropy coded;

performing entropy decoding on a current residual in the plurality of residuals based on a maximum value for arithmetic coding and a type of entropy coding for a sign of the current residual in the plurality of residuals, the current residual not being 0, wherein an absolute value of the current residual is to be decoded using the arithmetic coding when the absolute value of the current residual is within a range of two to the maximum value for the arithmetic coding; and reconstructing the mesh based on the entropy decoded current residual, wherein the sign of the current residual is determined based on a previous sign and whether the sign of the current residual is flipped from the previous sign, or the maximum value for the arithmetic coding is based on a bit depth associated with the current residual.

2. The method of claim 1, wherein the sign of the current residual in the plurality of residuals is determined based on the previous sign and a syntax element indicating whether the sign of the current residual is flipped from the previous sign.

3. The method of claim 2, wherein when the current residual is not an initial non-zero residual to be decoded prior to decoding remaining non-zero residuals in the plurality of residuals, the previous sign is a sign of a previous non-zero residual in the plurality of residuals according to a decoding order, a sequence of signs associated with the plurality of residuals including the sign of the current residual and the sign of the previous non-zero residual that are adjacent.

4. The method of claim 3, wherein the syntax element indicates a value of abs(curSign−prevSign), the curSign represents a value of the sign of the current residual, the prevSign represents the sign of the previous non-zero residual.

5. The method of claim 2, wherein the previous sign is a fixed value when the current residual is an initial non-zero residual to be decoded prior to the decoding of the remaining non-zero residuals in the plurality of residuals.

6. The method of claim 3, further comprising:

for each first non-zero residual that is different from the current residual and the initial non-zero residual, determining a sign of the first non-zero residual based on a sign of a previous non-zero residual of the first non-zero residual according to the decoding order and a syntax element indicating whether the sign of the first non-zero residual is flipped from the sign of the previous non-zero residual of the first non-zero residual; and for each second non-zero residual in a second plurality of residuals, determining a sign of the second non-zero residual in the second plurality of residuals based on a sign of a previous non-zero residual of the second non-zero residual according to the decoding order and a second syntax element indicating whether the sign of the second non-zero residual is flipped from the sign of the previous non-zero residual of the second non-zero residual, the plurality of residuals and the second plurality of residuals being different.

7. The method of claim 1, wherein the plurality of residuals includes a component of a sequence of residual vectors associated with vertex positions of the mesh, and each residual vector indicates a difference between a current vertex position and a predicted vertex position.

8. The method of claim 3, wherein the coded information indicates a flip sign flag for a second plurality of residuals, the flip sign flag indicating whether a second type of entropy coding for the second plurality of residuals is to be switched from the type of entropy coding for the plurality of residuals, the plurality of residuals and the second plurality of residuals being different;

for each first non-zero residual that is different from the current residual and the initial non-zero residual, determining a sign of the first non-zero residual based on a sign of a previous non-zero residual of the first non-zero residual according to the decoding order and a syntax element indicating whether the sign of the first non-zero residual is flipped from the sign of the previous non-zero residual of the first non-zero residual;

when the flip sign flag indicates that the second type of entropy coding for the second plurality of residuals is to be switched from the type of entropy coding for the plurality of residuals, for each second non-zero residual in the second plurality of residuals, determining a sign of the second non-zero residual in the second plurality of residuals directly without using a sign of a previous non-zero residual of the second non-zero residual according to the decoding order; and when the flip sign flag indicates that the second type of entropy coding for the second plurality of residuals is not to be switched from the type of entropy coding for the plurality of residuals, for each second non-zero residual in the second plurality of residuals, determining the sign of the second non-zero residual in the second plurality of residuals based on the sign of the previous non-zero residual of the second non-zero residual according to the decoding order and a second syntax element indicating whether the sign of the second non-zero residual is flipped from the sign of the previous non-zero residual of the second non-zero residual.

9. The method of claim 3, wherein for each first non-zero residual that is different from the current residual and the initial non-zero residual, determining a sign of the first non-zero residual based on a sign of a previous non-zero residual of the first non-zero residual according to the decoding order and a syntax element indicating whether the sign of the first non-zero residual is flipped from the sign of the previous non-zero residual of the first non-zero residual;

the method includes determining whether a second type of entropy coding for a second plurality of residuals is to be switched from the type of entropy coding for the plurality of residuals, the plurality of residuals and the second plurality of residuals being different;

when the second type of entropy coding is determined to be switched from the type of entropy coding for the plurality of residuals, for each second non-zero residual in the second plurality of residuals, determining a sign of the second non-zero residual in the second plurality of residuals directly without using a sign of a previous non-zero residual of the second non-zero residual according to the decoding order; and when the second type of entropy coding is determined not to be switched from the type of entropy coding, for each second non-zero residual in the second plurality of residuals, determining the sign of the second non-zero residual in the second plurality of residuals based on the sign of a previous non-zero residual of the second non-zero residual according to the decoding order and a second syntax element indicating whether the sign of the second non-zero residual is flipped from the sign of the previous non-zero residual of the second non-zero residual.

10. The method of claim 1, wherein the maximum value for the arithmetic coding is determined based on the bit depth associated with the current residual.

11. The method of claim 10, wherein the maximum value for the arithmetic coding that is applicable to the current residual is larger than a maximum value for the arithmetic coding that is applicable to a second residual in a second plurality of residuals when the bit depth associated with the current residual is larger than a bit depth associated with the second residual.

12. The method of claim 10, wherein the maximum value for the arithmetic coding further depends on an offset.

13. The method of claim 10, wherein the maximum value for the arithmetic coding is applicable to the plurality of residuals, and the coded information includes a syntax element indicating the maximum value for the arithmetic coding.

14. The method of claim 10, wherein the maximum value for the arithmetic coding is applicable to the mesh including the plurality of residuals, and the coded information includes a syntax element indicating the maximum value for the arithmetic coding for the mesh.

15. A method for encoding, the method comprising:

performing entropy encoding on a current residual in a plurality of residuals of a mesh based on a maximum value for arithmetic coding and a type of entropy coding for a sign of the current residual in the plurality of residuals, the current residual being not 0, wherein an absolute value of the current residual is to be encoded using the arithmetic coding when the absolute value of the current residual is within a range of two to the maximum value for the arithmetic coding; and encoding the mesh based on the entropy encoded current residual, wherein the sign of the current residual is encoded based on a previous sign and whether the sign of the current residual is flipped from the previous sign, or the maximum value for the arithmetic coding is determined based on a bit depth associated with the current residual.

16. The method of claim 15, wherein the sign of the current residual in the plurality of residuals is encoded based on the previous sign and whether the sign of the current residual is flipped from the previous sign.

17. The method of claim 16, wherein when the current residual is not an initial non-zero residual to be encoded prior to encoding remaining non-zero residuals in the plurality of residuals, the previous sign is a sign of a previous non-zero residual in the plurality of residuals according to an encoding order.

18. The method of claim 1, wherein the plurality of residuals includes a component of a sequence of residual vectors associated with vertex positions of the mesh, and each residual vector indicates a difference between a current vertex position and a predicted vertex position.

19. The method of claim 15, wherein the maximum value for the arithmetic coding is determined based on the bit depth associated with the current residual.

20. A method of processing a mesh, the method comprising:

processing a bitstream of the mesh according to a format rule, wherein the bitstream includes a plurality of residuals of the mesh, the plurality of residuals being entropy coded; and the format rule specifies that entropy decoding is performed on a current residual that is not 0 in the plurality of residuals based on a maximum value for arithmetic coding and a type of entropy coding for a sign of the current residual in the plurality of residuals, an absolute value of the current residual is to be decoded using the arithmetic coding when the absolute value of the current residual is within a range of two to the maximum value for the arithmetic coding;

the mesh is reconstructed based on the entropy decoded current residual; and the sign of the current residual is determined based on a previous sign and whether the sign of the current residual is flipped from the previous sign, or the maximum value for the arithmetic coding is based on a bit depth associated with the current residual.

* * * * *